(12) United States Patent
Goto

(10) Patent No.: US 6,493,992 B2
(45) Date of Patent: Dec. 17, 2002

(54) GLASS RUN AND ATTACHMENT STRUCTURE THEREFOR

(75) Inventor: Teruhito Goto, Aichi (JP)

(73) Assignee: Toyoda Gosei Co., Ltd., Nishikasugai-gun (JP)

(*) Notice: Subject to any disclaimer, the term of this patent is extended or adjusted under 35 U.S.C. 154(b) by 56 days.

(21) Appl. No.: 09/725,766

(22) Filed: Nov. 30, 2000

(65) Prior Publication Data

US 2001/0001917 A1 May 31, 2001

(30) Foreign Application Priority Data

Nov. 30, 1999 (JP) .......................................... 11-339172
Jan. 27, 2000 (JP) ........................................ 2000-019293
Feb. 18, 2000 (JP) ........................................ 2000-041625

(51) Int. Cl.[7] ................................................ E06B 7/16
(52) U.S. Cl. ........................................ 49/441; 49/495.1
(58) Field of Search ..................... 49/440, 441, 489.1, 49/495.1, 475.1

(56) References Cited

U.S. PATENT DOCUMENTS

| 4,704,820 | A |   | 11/1987 | Kisanuki |             |
|-----------|---|---|---------|----------|-------------|
| 5,010,689 | A | * | 4/1991  | Vaughan  | ..... 49/495.1 |
| 5,086,588 | A |   | 2/1992  | Nakano et al. | |
| 5,168,668 | A | * | 12/1992 | Mishima et al. | ..... 49/440 |
| 5,168,688 | A |   | 12/1992 | Neuhold | |
| 5,195,274 | A |   | 3/1993  | Mishima et al. | |
| 5,265,377 | A |   | 11/1993 | Iwasa et al. | |
| 5,365,698 | A |   | 11/1994 | Nozaki | |
| 5,414,961 | A | * | 5/1995  | Tessier  | ..... 49/441 |
| 5,916,075 | A | * | 6/1999  | Tanaka et al. | ..... 49/441 |
| 6,131,342 | A | * | 10/2000 | Miyamoto et al. | ..... 49/489.1 |

FOREIGN PATENT DOCUMENTS

JP          8-295134          11/1996

* cited by examiner

*Primary Examiner*—Jerry Redman
(74) *Attorney, Agent, or Firm*—Pillsbury Winthrop LLP

(57) ABSTRACT

A lock portion is formed on an end portion of an outside wall portion of a glass run which has a channel body portion and which is to be attached to a groove portion formed in a window frame of a vehicle. A detachment preventing protrusion portion is formed on an outside wall surface of the outside wall portion. Pressure-contact portions which are brought into pressure-contact with car-exterior-side and car-interior-side wall inner surfaces of the groove portion are provided on the outside surfaces of the base end portions of the outside and inside wall portions, respectively. The lock portion is brought into contact with a car-exterior-side outer edge of the window frame, and the body portion is rotated around the lock portion so as to be fitted into the groove portion.

18 Claims, 15 Drawing Sheets

//cdn.mathpix.com/cropped/2024_02_12_abc123.jpg?height=100&width=200&top_left_y=150&top_left_x=300

GLASS RUN AND ATTACHMENT STRUCTURE THEREFOR

BACKGROUND OF THE INVENTION

1. Field of the Invention

The present invention relates to a glass run and its attachment structure for attaching the glass run to a window frame which is formed on a vehicle door or the like.

The present application is based on Japanese Patent Applications No. Hei. 11-339172, 2000-19293 and 2000-41625, which are incorporated herein by reference.

2. Description of the Related Art

As shown in FIG. 21, in a front door of a vehicle, a window frame 513 is provided in an upper portion of a door body 512.

The front door 511 is provided with a window opening portion 514 which is opened and closed by a window glass 516. Along the opposite side portions and the upper side portion of the window opening portion 514, for example, there is formed the window frame 513 having a substantially U-shape in section, in which an inner side wall, an outer side wall and a bottom wall are formed to be bent. Along this window frame 513, a channel-like glass run 515 is disposed to surround the window glass 516. The glass run 515 is fitted into a groove portion which is formed at the inner circumference of the window frame 513. Thus, when the window glass 516 is moved up and down, the window glass 516 is guided by car-interior-side and car-exterior-side glass seal portions of the glass run 515 while the outside and inside of the cabin is sealed from each other.

The glass run 515 includes a body portion which is constituted by a bottom wall portion, an outside wall portion located on the car exterior side of the bottom wall portion, and an inside wall portion located on the car interior side of the bottom wall portion. The inside and outside wall portions are formed so that the inside wall portion is substantially as high as or a little higher than the outside wall portion.

Recently, a glass run in which such an inside wall portion is set to be two to four times as high as such an outside wall portion has been used to make the door attractive (Japanese Patent Publication No. Hei. 8-295134). A structure for attaching such a glass run to a window frame will be described with reference to FIG. 22.

FIG. 22 shows a cross section of an upper horizontal frame portion of the window frame 513, which is taken along line A—A in FIG. 21. A channel-like body portion 515a of a glass run 515 is fitted into a groove portion 525 which is provided in the window frame 513. The body portion 515a is constituted by a bottom wall portion 515b, an outside wall portion 515c and an inside wall portion 515d. Glass seal portions 515h and 515i are formed on the outside and inside wall portions 515c and 515d, respectively, so that the window glass 516 is slidably guided. A lock portion 515j which is to be locked in an outer edge 526 provided on the car-exterior-side wall of the window frame 513 at the groove portion 525, and a holding lip 515k which is to be locked in an inner surface of a car-interior-side wall of the window frame 513 at the groove portion 525, are integrally formed pm the body potion 515a.

An extended inside wall portion 515g is formed integrally with the inside wall portion 515d of the glass run 515. On the other hand, a protrusion 515o is attached on a receiving portion 530 of the window frame 513 with positioning and regulating, and a shield lip 515q is made to abut against a terminal portion 31 of a car-interior-member such as a garnish 24. Height H2 of the extended inside wall portion 515g from the bottom wall portion 515b is approximately three times as large as height H1 of the outside wall portion 515c.

A conventional glass run, which has not such an extended inside wall portion 515g, and has an inside wall portion being substantially as high as an outside wall portion, is adopted such an attachment method that the body portion of the glass run is moved up from underneath in a straight line so as to be fitted into the groove portion 525 of the window frame 513. In this method where fitting is attained by straight-line movement, however, there is a problem that the work of fitting is not performed smoothly at the glass run structure in FIG. 22 because it is very difficult to give the same pressure at an end of the outside wall portion 515c and an end of the inside wall portion 515d, respectively, and the outside wall portion 515c and the inside wall portion 515d are pressed toward the glass seal portions 515h and 515i respectively so as to come close to each other.

As a result, there arises a problem that the glass seal portions 515h and 515i interfere with each other so that the operation of fitting becomes very troublesome.

Further, as such a conventional glass run 515 in FIG. 22, for example, there is another problem as follows.

When the door 511 is opened or closed hard in the state where the window glass 516 is opened slightly, the upper end portion of the window glass 516 may be shaken by inertia force. Then, if the upper end portion of the window glass 516 exists in a position which is in the region of the glass run 515 and out of the glass seal portions 515h, 515i, the upper end portion of the window glass 516 collides with the extended inside wall portion 515g partially. Here, the glass run 515 is, for example, formed of solid rubber of ethylene-propylene-diene ternary copolymer (EPDM). Then, because the extended inside wall portion 515g of the glass run 515 has predetermined rigidity, the extended inside wall portion 515g cannot absorb the shock caused by the collision of the window glass 516 entirely. Thus, extended inside wall portion 515g further collides with the aforementioned inner side wall of the window frame 513 which is made of metal. There is a problem that an unpleasant collision sound is generated at this time. This problem is apt to be generated near the front end of the upper portion of the window frame 513 in the front door or near the rear end of the upper portion of the window frame 513 in the rear door because the shaking of the window glass 516 is great there.

In addition, the car-interior-side wall of the window frame 513 has the receiving portion 530 which projects in the direction of the car interior side. And the garnish 24 is covering the cat-interior-side wall of the window frame 513 and the protrusion 515o of the glass run 515.

The aforementioned garnish 24 is subjected to termination treatment in which the terminal portion 31 is brought into close contact with the protrusion 515o of the glass run 515 fitted to the groove portion 525 of the window frame 513.

As such a termination treatment structure, as shown in FIG. 22, there is generally adopted a structure in which the receiving portion 530 for bearing the forward end of the inside wall portion 515d is formed at the car-interior-side wall opening end of the groove portion 525 of the window frame 513, while a recess groove 540 is formed at the forward end of the inside wall portion 515d of the glass run 515 so as to be located between the shield lip 515d and the car-interior-side wall opening end of the groove portion 525, so that and end of the terminal portion 31 of the garnish 24 is fitted into the recess groove 540.

However, in the aforementioned terminal treatment structure, there is a possibility that when the end of the terminal portion 31 of the garnish 24 is lifted up to be fitted into the recess groove 540, the shield lip 515q of the glass run 515 may be fitted in between end of the terminal potion 31 of the garnish 24 and the car-interior-side wall opening end of the groove portion 525 so that desired fitting cannot be done. Accordingly, the termination treatment is difficult to be done, and not necessary to consume time.

SUMMARY OF THE INVENTION

It is a first object of the present invention to provide a glass run and a glass run attachment structure in which the work of attaching a glass run to a window frame can be achieved easily, and the attachment state of the glass run can be held stably.

In order to achieve the above object, there is provided a glass run attachable to a window frame of a vehicle, comprising: a channel-like body portion having an outside wall portion, a bottom wall portion and an inside wall portion; a lock portion formed in an end portion of the outside wall portion; a detachment preventing protrusion portion formed on an outside wall surface of the outside wall portion; and at least two pressure-contact portions respectively provided on base end portions of the outside wall portion and the inside wall portion corresponding to both ends of the bottom wall portion so as to be brought into pressure-contact with a car-exterior-side wall inner surface and a car-interior-sidewall inner surface of the groove portion of the window frame, wherein the inside wall portion is larger than the outside wall portion, wherein the lock portion is brought into contact with a car-exterior-side outer edge of the window frame, while the body portion of the glass run is rotated around the lock portion so as to be fitted into the groove portion.

Further, there is provided a glass run attachment structure for attaching a glass run to a window frame of a vehicle, the glass run having a channel-like body portion corresponding to a groove portion formed in the window frame, the structure comprising: a lock portion formed in an end portion of an outside wall portion of the glass run; a detachment preventing protrusion portion formed on an outside wall surface of the outside wall portion; and pressure-contact portions respectively provided on outside surfaces of base end portions of the outside wall portion and an inside wall portion corresponding to a bottom wall portion so as to be brought into pressure-contact with a car-exterior-side wall inner surface and a car-interior-sidewall inner surface of the groove portion of the window frame; wherein the inside wall portion is larger than the outside wall portion, wherein the lock portion is brought into contact with a car-exterior-side outer edge of the window frame, while the body portion of the glass run is rotated around the lock portion so as to be fitted into the groove portion.

In the glass run attachment structure, the pressure-contact portions preferably include an outside holding lip and an inside holding lip which are elastically deformed when the body portion of the glass run is rotated to be fitted into the groove portion.

In the glass run attachment structure, compression-direction force is preferably given to at least the outside holding lip of the outside and inside holding lips when the outside and inside holding lips are elastically deformed, whereupon the body portion is urged to a bottom side of the groove portion by compression-direction restoring force of the outside holding lip after the body portion is fitted into the groove portion.

In the glass run attachment structure, a rough surface is preferably formed in a tip end portion of at least the outside holding lip of the outside and inside holding lips.

Preferably, in the glass run attachment structure, the body portion is constituted by the bottom wall portion, the outside wall portion and the inside wall portion, and is extruded so as to be developed by car-exterior-side and car-interior-side bent portions between the outside and inside wall portions and the bottom wall portion; a gap is established between an outer surface of the car-exterior-side bent portion and a bottom wall surface of the groove portion; the car-interior-side bent portion is brought into pressure-contact with the bottom wall surface; and a sealing lip is provided on the car-exterior-side bent portion so as to abut against the bottom wall surface.

In the glass run attachment structure, the groove portion of the window frame is preferably formed so that a width thereof is smaller than a distance between tip end portions of the pressure-contact portions.

In the glass run attachment structure, a gap is preferably established between the detachment preventing protrusion portion and a lock step portion provided in the car-exterior-side wall inner surface of the groove portion.

Preferably, in the glass run attachment structure, a receiving portion is formed as a lock portion with positioning and regulating in an inner circumference of an inner reinforce which constitutes the window frame; a terminal portion is formed as a lock portion in a garnish; and a lifting and holding lip is provided on an extended inside wall portion of the glass run so as to be brought into pressure-contact with the receiving portion, while a locked protrusion portion is formed as a locked portion which is to be locked by the terminal portion.

It is another object of the present invention to perform termination treatment between a glass run and a garnish of a window frame surely and with a good workability, and to stabilize a terminal treatment portion.

In order to achieve the above object, according to an aspect of the present invention, there is provided a glass run attachment structure comprising a glass run having a body portion substantially U-shaped in section and seal lips extending from opposite side wall portions of the body portion so as to hold an outer circumference of a door glass from opposite sides of the door glass, the glass run being fitted into a groove portion of a window frame, and further comprising a garnish covering a car-interior-side surface of the window frame, a terminal portion of the garnish being brought into close contact with a forward end of the inside wall portion of the glass run, wherein inside wall portion of the glass run has a lip portion formed at the forward end so as to extend from the forward end down below a car-interior-side wall opening end of the groove portion of the window frame, and the terminal portion of the garnish is fitted in between the lip portion and the car-interior-side wall opening end.

In the above glass run attachment structure, preferably, a receiving portion is formed at the car-interior-side wall opening end of the groove portion, and the lip portion is made to extend down below the receiving portion, and wherein another lip portion is formed at the forward end of the inside wall portion of the glass run so as to be closer to an outside surface of the side wall than the first-mentioned lip portion and to extend from the forward end of the inside wall portion to thereby press on the receiving portion when the glass run is attached to the window frame.

According to the present invention, a lip portion is formed at the forward end of the car-interior-side side wall of the glass run so as to extend down below the car-interior-side opening end of groove portion of the window frame. Accordingly, if the terminal portion of the garnish is lifted up along the lip portion, the terminal portion is fitted in between the car-interior-side wall opening end and the lip portion surely. In addition, if another lip portion is formed at the forward end of the inside wall portion of the glass run, the lip presses onto the receiving portion of the opening end while the lip is bent. Accordingly, the forward end of the inside wall portion of the glass run is stabilized so that the terminal portion of the garnish engaged therewith is also stabilized.

It is still another object of the present invention to provide a glass run which can reduce a collision sound caused by the opening and closing of a door in the condition that a window glass is opened slightly.

There is provided a vehicle door sealing structure for sealing off the inside of a cabin from the outside thereof with the glass run fitted in the window frame formed in a vehicle door; wherein shock absorbing means is provided in at least one of an inner circumferential surface of an upper portion of the window frame and an inside wall portion of the glass run.

The shock absorbing means is preferably provided to absorb the shock when the window glass collides with the glass run. It is therefore possible to reduce a collision sound generated by this collision.

Preferably, the glass run is constituted by a bottom wall portion and inside and outside wall portions so as to have a substantially U-shape in cross section, and glass seal portions are provided in the inside and outside wall portions, at least one of the glass seal portions being formed to extend from a middle of inside wall portion, an extended inside wall portion being formed between a base end portion of the glass seal portion and a forward end of the inside wall portion, the shock absorbing means being provided in at least one of the extended inside wall portion and the car-interior-side wall inner surface of the groove portion of the window frame corresponding to the extended inside wall portion.

In the above glass run, when the window glass is moved down slightly, it is possible to reduce a collision sound effectively, particularly in the glass run which is apt to be detached from the glass seal portion in the region of the glass run.

Preferably, the shock absorbing means is provided at least at a front end of an upper portion of a window frame of a front door, or in a vicinity of the front end of the upper side portion, or in the extended inside wall portion of the glass run corresponding to the front end of the upper portion of the window frame or the vicinity of the front end of the upper portion of the window frame.

In the above glass run, preferably, the shock absorbing means is provided at least at a rear end of an upper portion of a window frame of a rear door, or in a vicinity of the rear end of the upper portion, or in the extended inside wall portion of the glass run corresponding to the rear end of the upper portion of the window frame or the vicinity of the rear end of the upper portion of the window frame.

The shock absorbing means is preferably provided in a portion where the quantity of movement of the window glass increases when the door is opened or closed hard, so that it is possible to reduce a collision sound more effectively.

Preferably, the shock absorbing means is constituted by a hollow portion formed in the side wall portion of the glass run.

Preferably, the shock absorbing means is constituted by a lip portion formed in the inside wall portion of the glass run.

The operation of the invention can be attained with a simple structure.

Preferably, the lip portion is provided so that a forward end portion of the lip portion is released in a free state before the glass run is attached to the window frame, and the forward end portion abuts against a side surface of the inside wall portion so as to form a hollow portion in at least one of occasions when the window glass moves toward the car interior side and when the glass run is variously attached to the window frame.

The glass run in which shock absorbing means formed by a hollow portion is provided in the inside wall portion can be realized with a simple mold structure.

The shock absorbing means is preferably constituted by a sponge layer molded on at least one of surfaces of the inside wall portion of the glass run so as to be integrated with the inside wall portion.

The sponge layer is provided in the inside wall portion of the glass run, so that the operation of the invention can be attained with a simple structure. In addition, the sponge layer can be formed to be close to the forward end portion of the inside wall portion with respect to the open and close direction of the window glass. Accordingly, even if the window glass collides with the forward end of the inside wall portion of the glass run, the collision sound generated by the collision can be reduced.

The shock absorbing means may be a sponge member bonded onto at least one of a surface of the inside wall portion of the glass run and an inner circumferential surface of the window frame.

The sponge member is bonded onto at least one of the inside wall portion of the glass run and the inner circumferential surface of the window frame, so that the operation of the invention can be attained with a simple structure. In addition, a collision sound can be reduced more surely and effectively by adjusting the size and bonded position of the sponge member. Further, it is possible to use a common sponge member regardless of the shapes of the glass run and the window frame. In addition, when the sponge member is bonded onto the inside wall portion of the glass run, the work of bonding is so easy that it is possible to restrain the labor of a worker from increasing at the time of the work of assembling the glass run.

Features and advantages of the invention will be evident from the following detailed description of the preferred embodiments described in conjunction with the attached drawings.

DETAILED DESCRIPTION OF THE PREFERRED EMBODIMENTS

A first embodiment for carrying out the present invention will be described below with reference to FIGS. 1 to 10.

Figure 6:
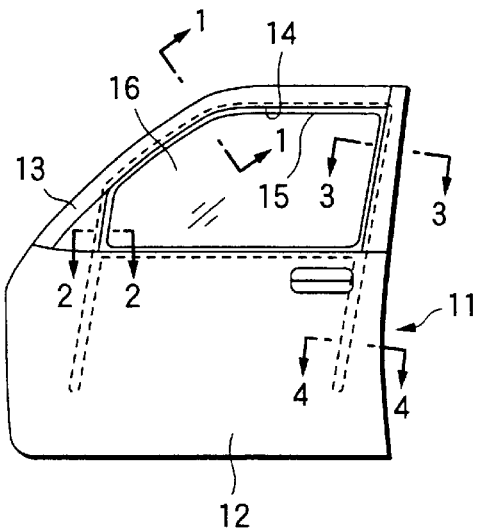
FIG. 6 shows a front view showing a left front door of a vehicle.

FIG. 6 shows a front view of a left front door 11 of a vehicle, which is viewed from the car exterior side. A window frame 13 is mounted on an upper portion of a door body 12 which constitutes this front door 11. A window opening 14 is formed by this window frame 13 and the upper edge of the door body 12. A glass run 15 is attached to the inner circumference of the window opening 14 and the inside of the door body 12, so as to guide a window glass 16 for its up and down movement.

Figure 7:
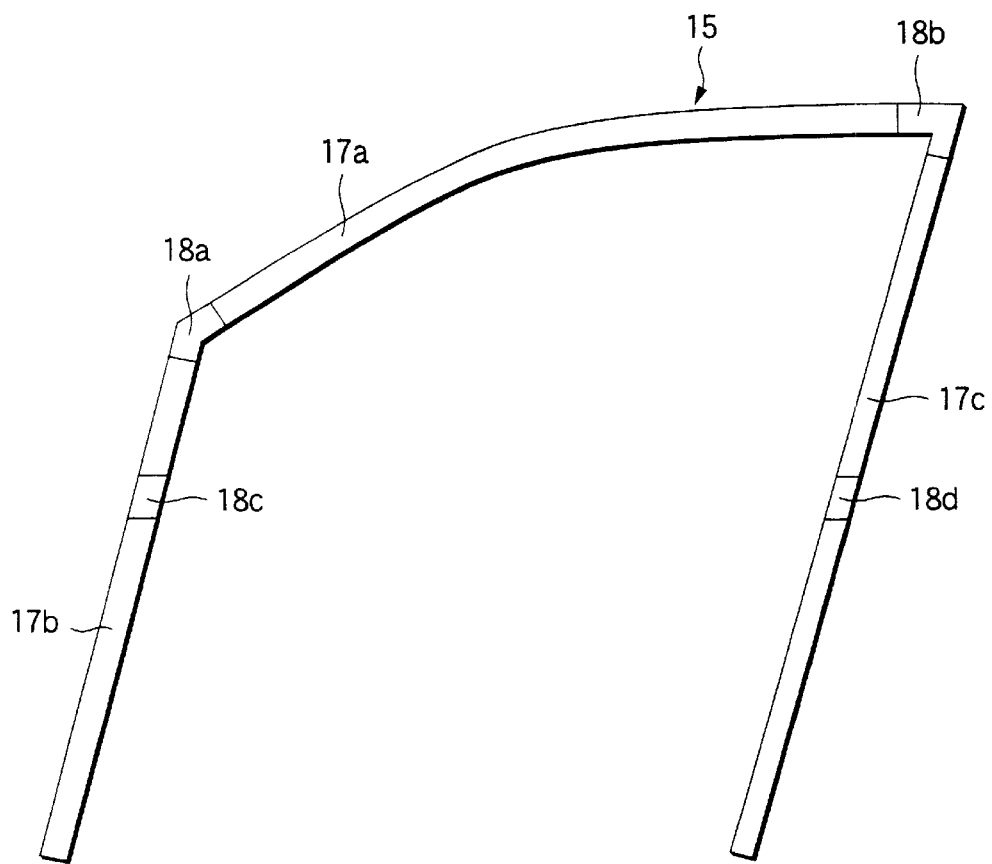
FIG. 7 shows a front view showing the glass run used in a window frame in FIG. 6.

FIG. 7 is a front view of only the glass run 15, simplified and viewed from the exterior. This glass run 15 is constituted by a first extrusion-molded portion 17a corresponding to an upper horizontal frame portion of the window frame 13, a second extrusion-molded portion 17b corresponding to a front vertical frame portion of the front door 11, and a third extrusion-molded portion 17c corresponding to a rear vertical frame portion of the front door 11. The front end portion of the first extrusion-molded portion 17a is connected to the upper end portion of the second extrusion-molded portion 17b through a first molded portion 18a. The rear end portion of the first extrusion-molded portion 17a is connected to the upper end portion of the third extrusion-molded portion 17c through a second molded portion 18b. Incidentally, portions of the second and third extrusion-molded portions 17b and 17c to be disposed inside the door body 12 are connected to extrusion-molded portions having small sections, through molded portions 18c and 18d, respectively.

As the material of the glass run 15, there can be used, for example, rubber such as ethylene-propylene-diene terpolymer (EPDM) or the like, thermoplastic olefin elastomer, soft synthetic resin such as soft polyvinyl chloride or the like, or a polymer blend of such polymers.

Figure 1:
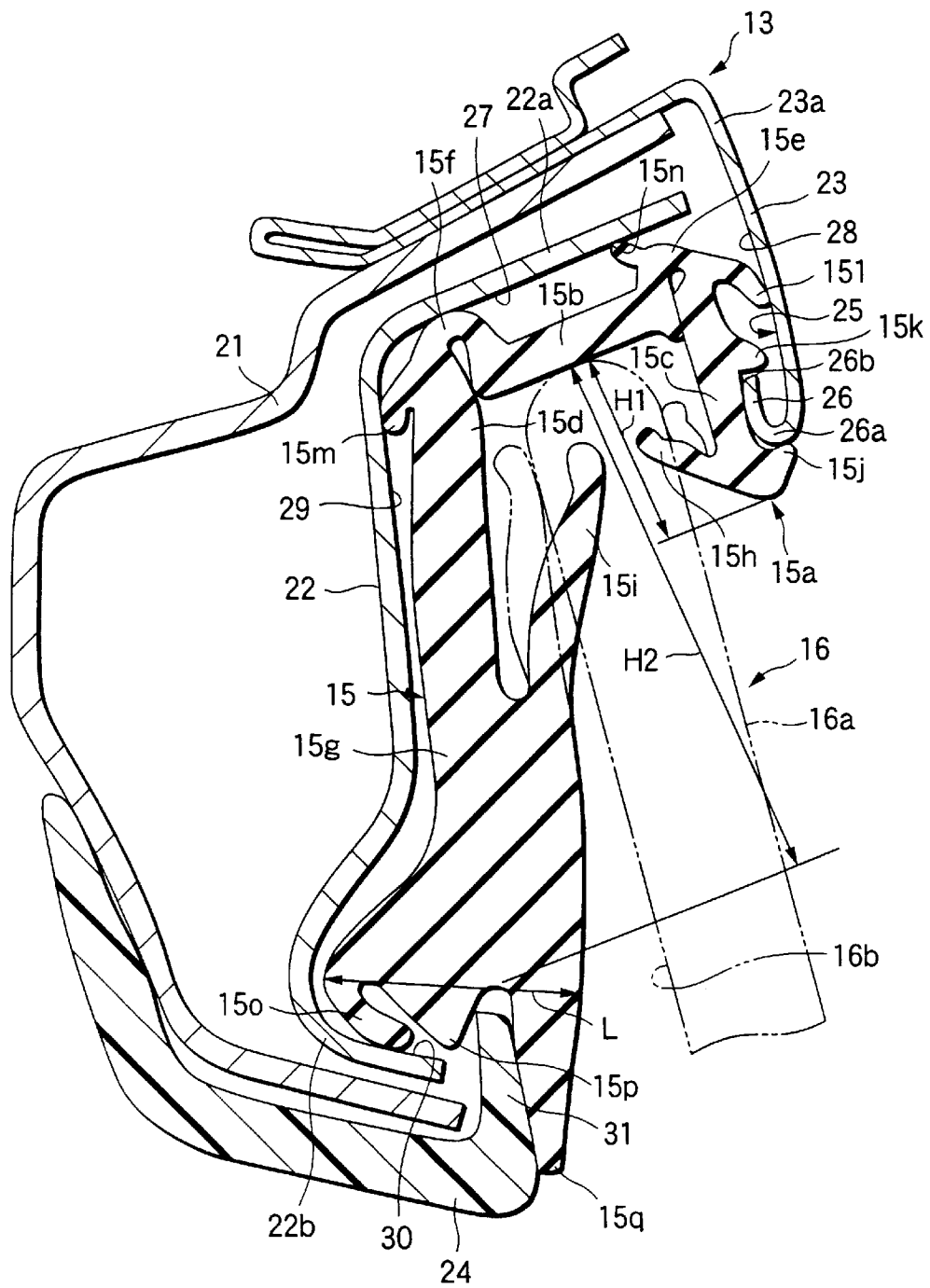
FIG. 1 shows an enlarged sectional view showing a first embodiment embodying a structure for attaching a glass run according to the present invention, corresponding to line 1—1 in FIG. 6.
Figure 8:
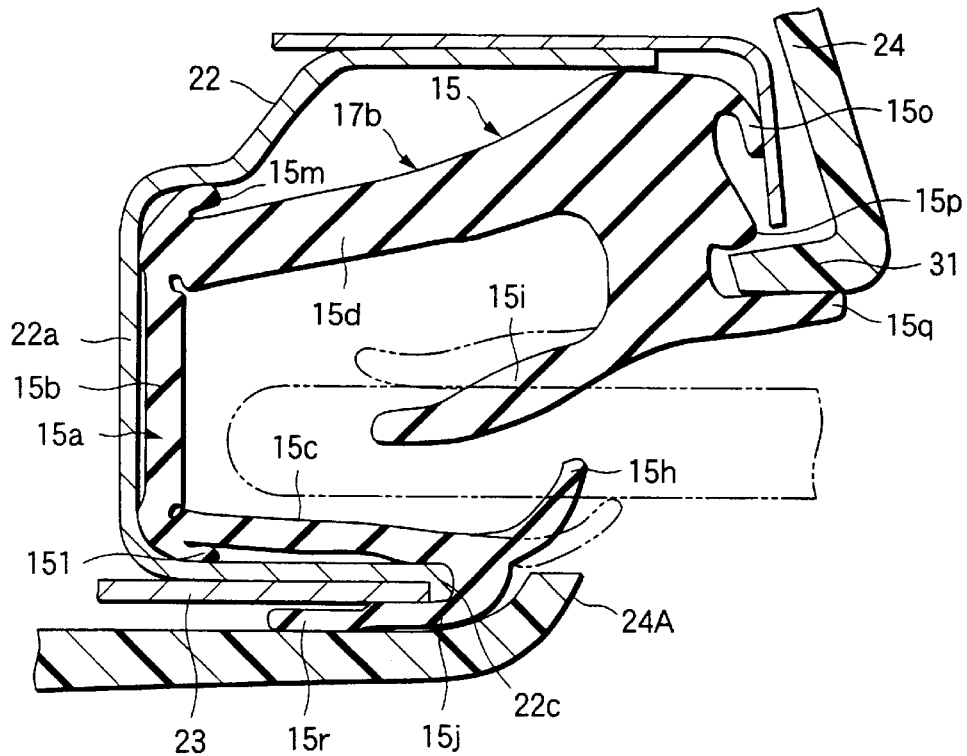
FIG. 8 shows an enlarged sectional view showing a structure for attaching the glass run, corresponding to line 2—2 in FIG. 6.
Figure 9:
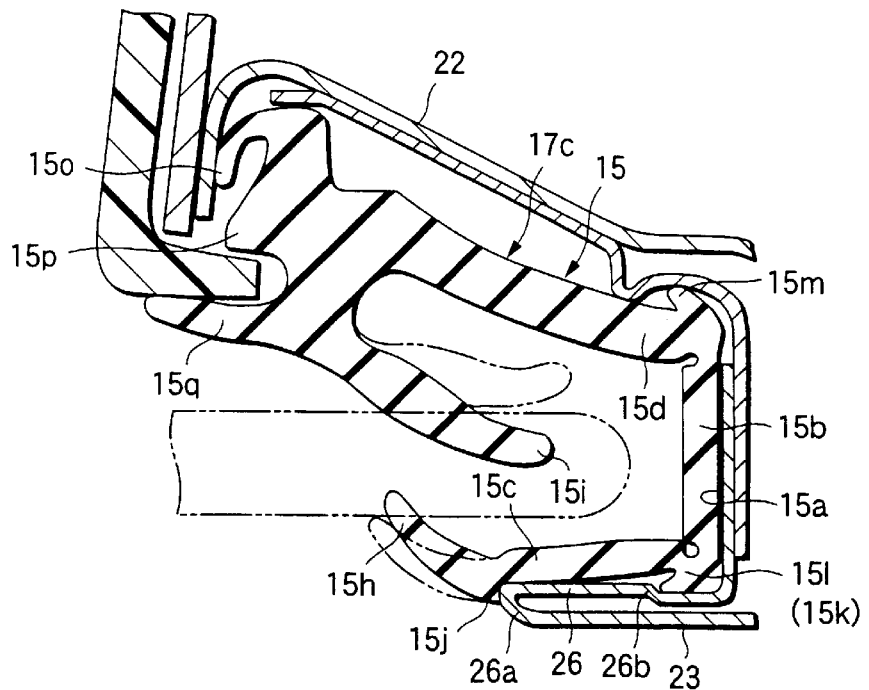
FIG. 9 shows an enlarged sectional view showing the structure for attaching the glass run, corresponding to line 3—3 in FIG. 6.
Figure 10:
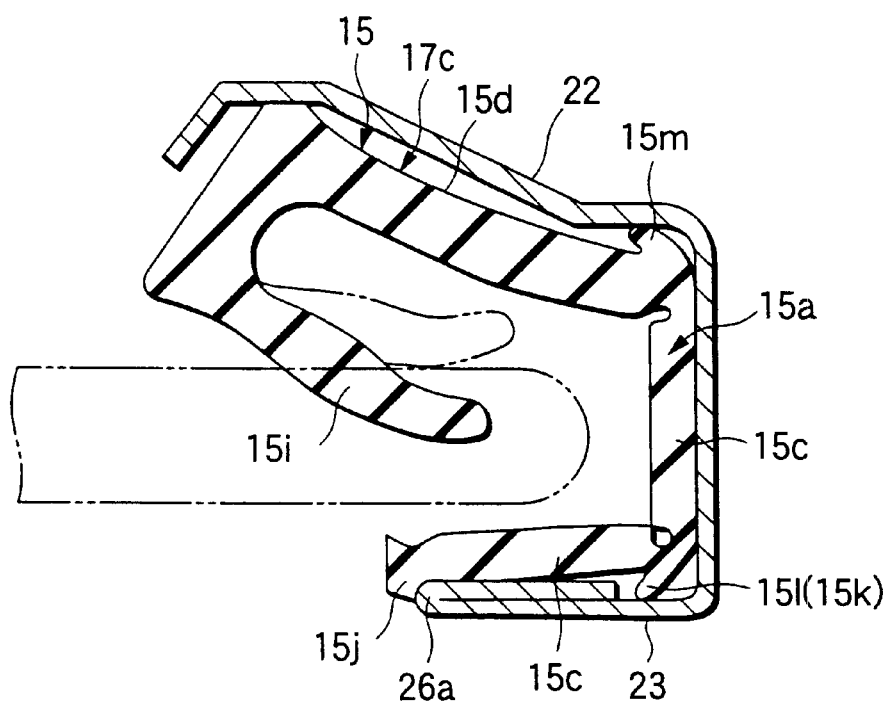
FIG. 10 shows an enlarged sectional view showing the structure for attaching the glass run, corresponding to line 4—4 in FIG. 6.

Here, description will be made about the interrelationship among FIG. 1 and FIGS. 7 to 10. FIG. 1 shows a section of the attachment state of the first extrusion-molded portion 17a corresponding to the line 1—1 in FIG. 6; FIG. 8 shows a section of the attachment state of the second extrusion-molded portion 17b corresponding to the line 2—2 in FIG. 6; FIG. 9 shows a section of the attachment state of the third extrusion-molded portion 17c corresponding to the line 3—3 in FIG. 6; and FIG. 10 shows a section of the attachment state of the third extrusion-molded portion 17c corresponding to the line 4—4 in FIG. 6.

Next, with reference to FIGS. 1 and 2, description will be made about the attachment structure of the first extrusion-molded portion 17a corresponding to the window frame 13, which is a main portion of the present invention.

As shown in FIG. 1, an inner reinforce 22 made of metal in the same manner is fixed through not-shown connecting means on the inner circumferential side of an inner panel 21 which constitutes the window frame 13 and which is made of metal material. A side molding 23 of metal is fixed to the outside surface of the inner panel 21 by welding or the like, while a garnish 24 of synthetic resin is fixed and covering to the inside surface of the inner panel 21 by not-shown connecting means.

In this embodiment, a groove portion 25 of the window frame 13 for fitting a body portion 15a of the glass run 15 therein is formed by the body of the inner reinforce 22, a bent portion 22a on the outer circumference thereof, and an outside wall portion 23a of the molding 23. In the inner circumferential edge portion of the molding 23, a folded portion 26 is formed integrally with the molding 23 so as to be located on the car interior side. A bottom wall surface 27 of the groove portion 25 is constituted by the bent portion 22a, a car-exterior-side wall surface 28 of the groove portion 25 is constituted by the outside wall portion 23a of the molding 23, and a car-interior-side wall inner surface 29 of the groove portion 25 is constituted by the side wall portion of the body of the inner reinforce 22.

Figure 3:
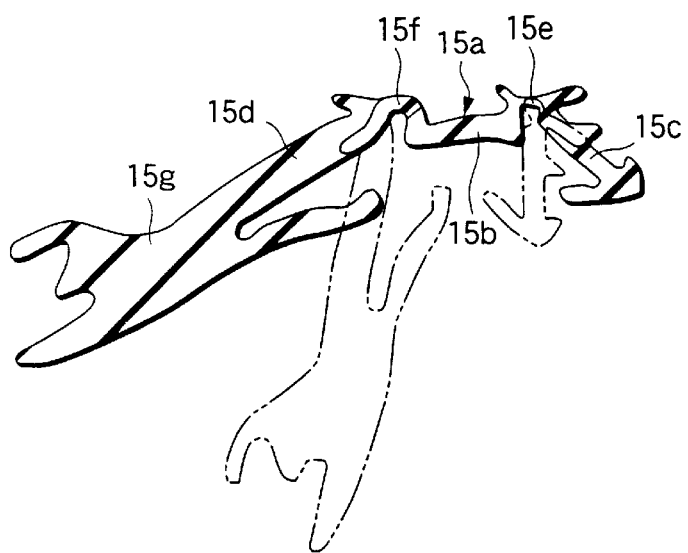
FIG. 3 shows a sectional view of a natural state of a glass run of the first embodiment.

The body portion 15a of the glass run 15 is formed like a channel by a bottom wall portion 15b, an outside wall portion 15c and an inside wall portion 15d. The bottom wall portion 15b is connected to the outside and inside wall portions 15c and 15d through arcuate bent portions 15e and 15f on the car exterior and interior sides so as to be able to be developed in a free state as shown in FIG. 3, respectively. An extended inside wall portion 15g is formed integrally with the inner circumference of the inside wall portion 15d. A glass seal portion 15h allowed to abut against a surface 16a of the window glass 16 is formed at an inner edge of the outside wall portion 15c. A glass seal portion 15i allowed to abut against a back surface 16b of the window glass 16 is formed integrally with the outside surface of the inside wall portion 15d.

As shown in FIG. 1, height H2 of the inside wall portion 15d and the extended inside wall portion 15g from the bottom wall portion 15b is approximately three times as large as height H1 of the outside wall portion 15c.

A lock portion 15j is formed integrally with the inner edge of the outside wall portion 15c of the glass run 15 so as to protrude to the car exterior side. This lock portion 15j is pressed onto an outer edge 26a of the folded portion 26 so as to abut thereon. Thus, sealing is achieved between the glass run 15 and the molding 23. This outer edge 26a becomes a car-exterior-side wall opening edge of the window frame 13. A detachment preventing protrusion portion 15k is formed integrally with the outside surface of the outside wall portion 15c so as to face an inner edge 26b of the folded portion 26 through a first gap G1, as shown in FIG. 2. This first gap G1 is formed by setting a vertical distance W between the lock portion 15j and the detachment preventing protrusion portion 15k to be larger than formation width D of the folded portion 26, as shown in FIG. 2.

An outside holding lip 15l is formed integrally with the outside surface of the outside wall portion 15c correspondingly to the bottom wall portion 15b. The tip end portion of this outside holding lip 15l is brought into pressure-contact with the car-exterior-sidewall inner surface 28 of the groove portion 25. An outside holding lip 15m is formed integrally with the car-interior-side outside surface of the inside wall portion 15d correspondingly to the bottom wall portion 15b. The tip end portion of this inside holding lip 15m is brought into pressure-contact with the car-interior-side wall inner surface 29 of the groove portion 25.

Figure 2:
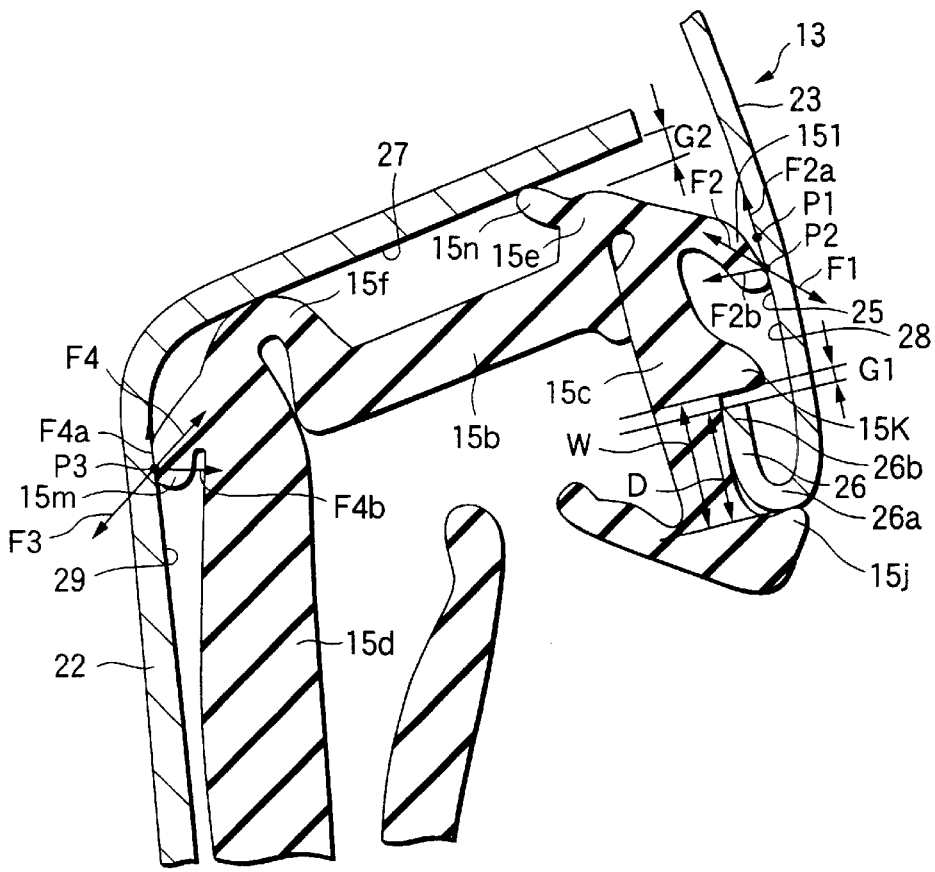
FIG. 2 shows an enlarged sectional view of a main portion.

In FIG. 2, the distance between the inner surfaces 28 and 29 of the groove portion 25, that is, the width of the groove portion 25 is formed to be smaller than the distance between the tip end portions of the outside and inside holding lips 15l and 15m of the glass run 15 which is not fitted in. Then, when the glass run 15 is fitted in, both the holding lips 15l and 15m are compressed and pressed onto the inner surfaces 28 and 29, respectively.

A second gap G2 is provided between the car-exterior-side bent portion 15e and the bottom wall surface 27. A sealing lip 15n formed integrally with the car-exterior-side bent portion 15e is brought into pressure-contact with the bottom wall surface 27 so as to seal the second gap G2. The car-interior-side bent portion 15f is brought into pressure-contact with the bottom wall surface 27.

A lifting and holding lip 15o is formed integrally with the inner circumferential edge of the extended inside wall portion 15g of the glass run 15. The lifting and holding lip 15o is brought into pressure-contact with a receiving portion 30 which is formed as a lock portion with positioning and regulating by a bent portion 22b bent to the car exterior side at the inner circumferential edge of the inner reinforce 22. In addition, a locked protrusion portion 15p is formed integrally with the inner circumferential edge of the extended inside wall portion 15g, as a locked portion which is to be locked to climb, from the car exterior side to the car interior side, over a terminal portion 31 which is formed integrally with a garnish 24 as a lock portion. Further, a shield lip 15q is formed integrally with the inner circumferential edge of the extended inside wall portion 15g so as to be brought into pressure-contact with the outside surface of the terminal portion 31.

Next, description will be made about the structure for attaching the second extrusion-molded portion 17b of the glass run 15 to the front vertical frame portion of the window frame 13 with reference to FIG. 8.

As shown in FIG. 8, the aforementioned extended inside wall portion 15g is omitted from the second extrusion-molded portion 17b, but the lifting and holding lip 15o, the locked protrusion portion 15p and the shield lip 15q are formed on the inside wall portion 15d. In addition, the molding 23 is bonded with a flange portion 22c which is formed on the inner reinforce 22. The aforementioned lock portion 15j is locked in this bonding portion. A seal lip 15r for sealing the molding 23 is formed in this lock portion 15j. The lock portion 15j and the seal lip 15r are sealed by a frame garnish 24A.

The window glass 16 is merely moved up and down without allowing the window glass 16 to have access to the body portion 15a. Accordingly, the glass seal portion 15h is pointed in a direction opposite to the direction in which the glass seal portion 15i points, that is, toward the outside.

FIG. 9 shows a structure for attaching the third extrusion-molded portion 17c of the glass run 15 to the rear vertical frame portion of the window frame 13.

The structure for attaching the third extrusion-molded portion 17c is basically similar to the structure for attaching the second extrusion-molded portion 17b shown in FIG. 8, except that the lock portion 15j is locked in the molding 23 and the outside holding lip 15l also has a function as the detachment preventing protrusion portion 15k.

FIG. 10 shows the attachment structure for the third extrusion-molded portion 17c, below a belt line. Since the glass run 15 in this portion is received inside the door body 12, the glass seal portion 15h, the shield lip 15q, the locked protrusion portion 15p, the lifting and holding lip 15o, and so on, are omitted therefrom.

Next, description will be made about a method for attaching the glass run 15 to the door body 12 and the window frame 13.

The summary of the work of attaching the first to third extrusion-molded portions 17a to 17c which constitute the glass run 15 shown in FIG. 7 will be described. The work starts from the attachment of the second molded portion 18b to the upper rear end portion of the window opening 14 in FIG. 6. Next, the first extrusion-molded portion 17a is fitted into the groove portion 25 of the window frame 13 successively from its rear end portion to its front end portion. Further, the first molded portion 18a is fitted into the groove portion 25, and the work of attaching the second extrusion-molded portion 17b is performed from its upper end portion to its lower end portion. Then, the work of attaching the third extrusion-molded portion 17c is performed from its upper end portion to its lower end portion.

Figure 4:
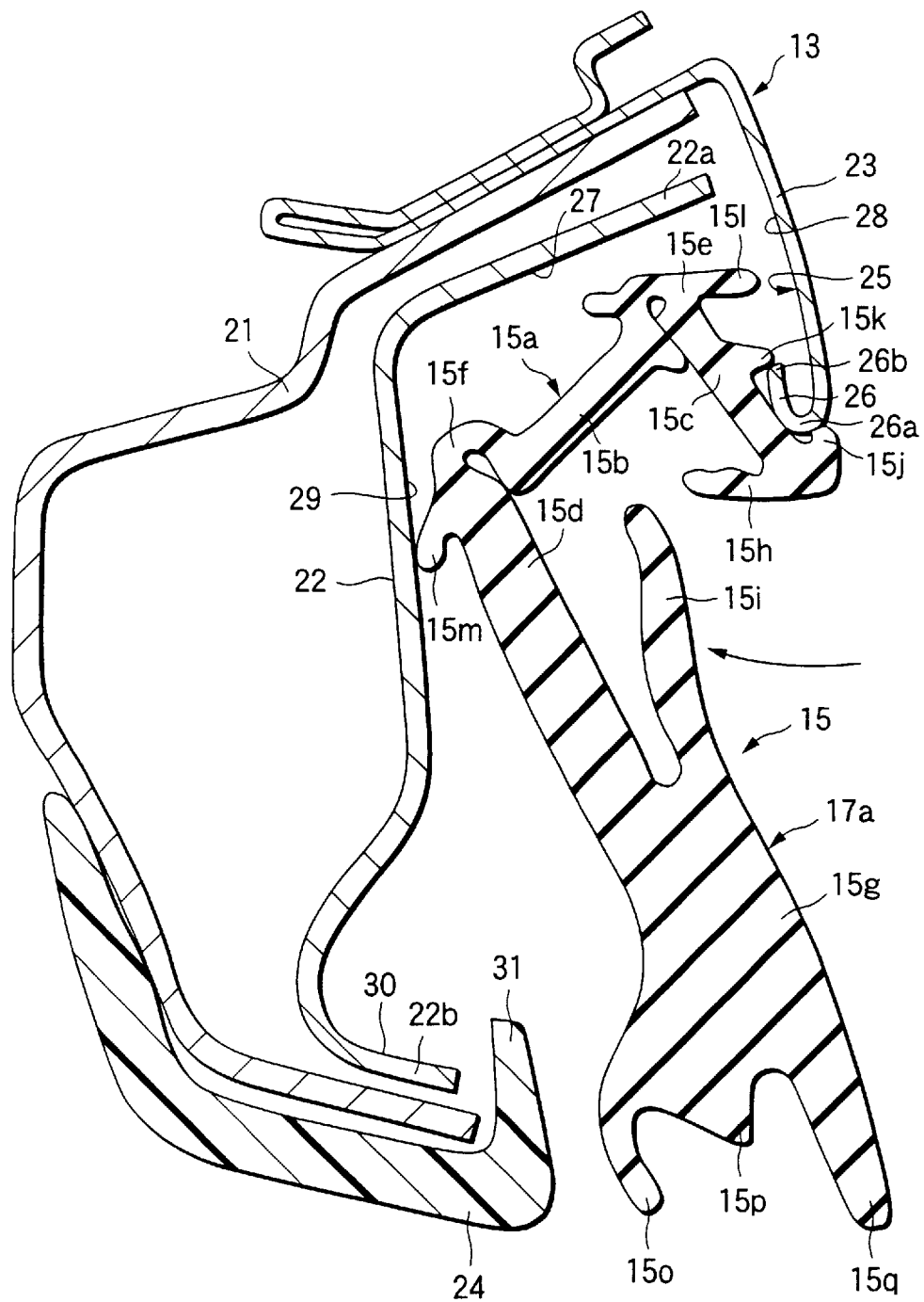
FIG. 4 shows a sectional view of a method for attaching the first embodiment.

Here, description will be made about the work of attaching the first extrusion-molded portion 17a. The body portion 15a is deformed from its development state shown in FIG. 3 to its use state shown by the chain line in FIG. 3. In this state, the body portion 15a of the first extrusion-molded portion 17a is put into the groove portion 25 of the window frame 13 while being inclined, as shown in FIG. 4. Thus, the lock portion 15j is locked in the outer edge 26a of the folded portion 26.

Then, when the extended inside wall portion 15g is pushed up, the body portion 15a is rotated clockwise in FIG. 4 around the lock portion 15j (the outer edge 26a). By this operation of rotation, the inside holding lip 15m is pressed onto the car-interior-sidewall surface 29 of the groove portion 25 while the outside holding lip 15*l* is made close to the car-exterior-side wall surface 28.

Figure 5:
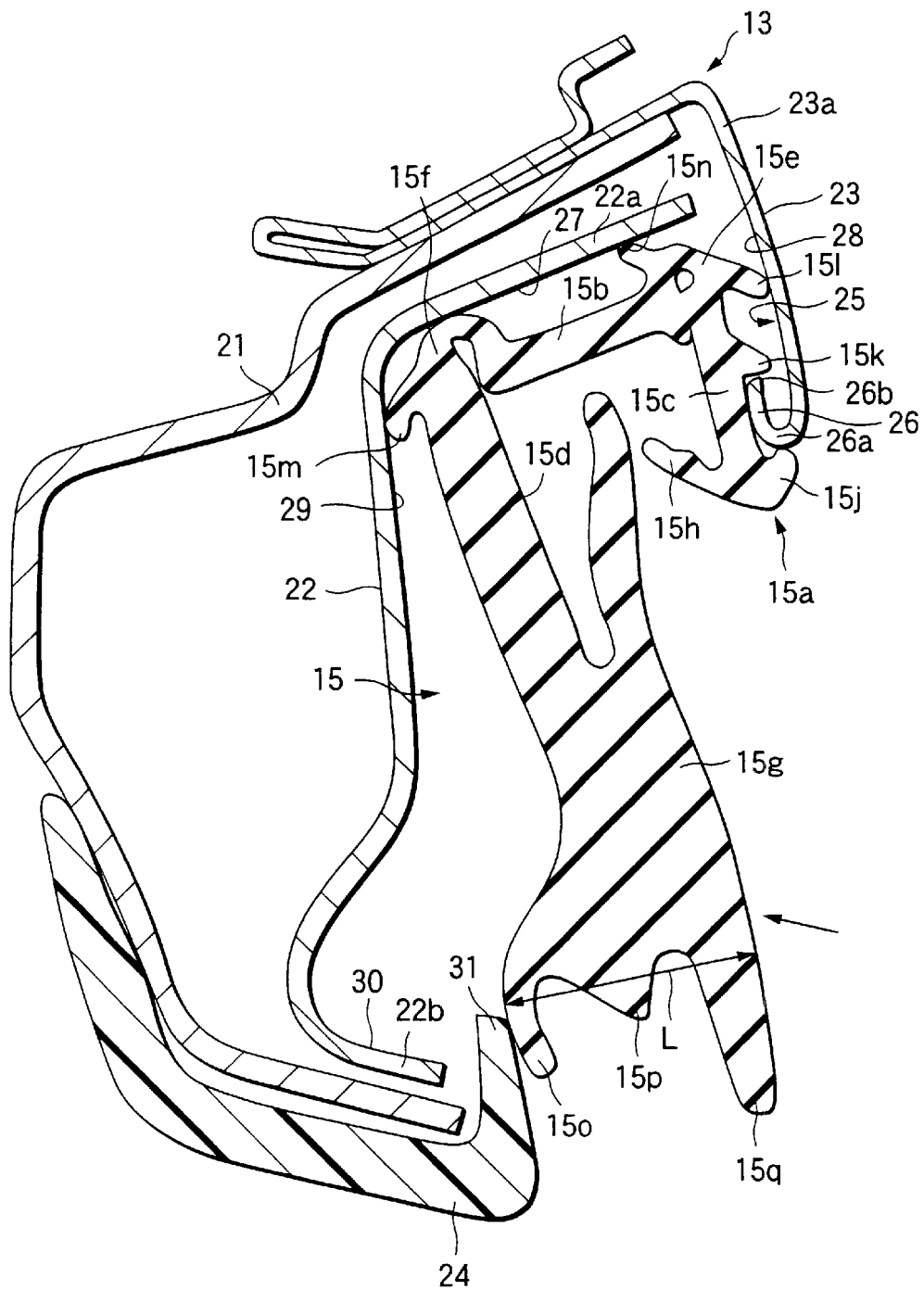
FIG. 5 shows a sectional view of the method for attaching the first embodiment.

As shown in FIG. 5, when the body portion 15*a* is rotated until the car-interior-side bent portion 15*f* is pressed onto the bottom wall surface 27 of the groove portion 25, the outside and inside holding lips 15*l* and 15*m* are compressed to be bent arcuately, while the sealing lip 15*n* is brought into contact with the bottom wall surface 27.

Next, when the extended inside wall portion 15*g* is pushed toward the car interior side as shown by the arrow in FIG. 5, the lifting and holding lip 15*o* and the locked protrusion portion 15*p* are elastically deformed while being moved to climb over the terminal portion 31 toward the car interior side. Thus, as shown in FIG. 1, the lifting and holding lip 15*o* is brought into pressure-contact with the receiving portion 30 while the locked protrusion portion 15*p* is locked by the terminal portion 31 of the garnish 24. In addition, the shield lip 15*q* is brought into pressure-contact with the outside surface of the terminal portion 31 of the garnish 24. In this state, the extended inside wall portion 15*g* and the inside wall portion 15*d* are urged upward by the compression counterforce of the lifting and holding lip 15*o*. As a result, the body portion 15*a* is held in a predetermined position in the groove portion 25.

In the work of attaching the second and third extrusion-molded portions 17*b* and 17*c* of the glass run 15 shown in FIGS. 8 and 9, the extended inside wall portion 15*g* is not provided. Therefore, the body portion 15*a* is moved in a straight line so as to be fitted into the groove portion 25. Then, the lifting and holding lip 15*o* and the locked protrusion portion 15*p* are moved to the car interior side of the terminal portion 31. Thus, the work of attaching the second and third extrusion-molded portions 17*b* and 17*c* is completed. In place of this fitting operation, a fitting operation similar to the aforementioned rotation-type fitting operation may be performed.

According to the structure for attaching the glass run 15 in the aforementioned embodiment, it is possible to obtain the following features.

(1) In the aforementioned embodiment, the lock portion 15*j* provided on the outside wall portion 15*c* of the glass run 15 is locked in the outer edge 26*a* of the folded portion 26 of the window frame 13, and the glass run 15 is rotated around the lock portion 15*j* so as to be fitted into the groove portion 25. It is therefore possible to perform the attachment work smoothly even if the extended inside wall portion 15*g* is provided on the inside wall portion 15*d* of the glass run 15.

Incidentally, a horizontal distance L from the car-exterior-side surface of the shield lip 15*q* to the lifting and holding lip 15*o* is long. However, there is no obstacle to the aforementioned operation of rotating the body portion 15*a* in FIGS. 4 and 5.

(2) In the aforementioned embodiment, the outside and inside holding lips 15*l* and 15*m* are formed on the base end portions of the outside and inside wall portions 15*c* and 15*d*, respectively, and both the lips 15*l* and 15*m* are elastically deformed so as to be brought into pressure-contact with both the car-exterior-side and car-interior-side wall inner surfaces 28 and 29 of the groove portion 25. Accordingly, the bottom wall portion 15*b* of the body portion 15*a* can be held in a predetermined position by the snap force of the lips 15*l* and 15*m*, so that the pressure-contact of the lock portion 15*j* with the outer edge 26*a* canbe held stably. It is therefore possible to prevent a harmful gap between the outer edge 26*a* and the (3) In the aforementioned embodiment, in the process where the body portion 15*a* is rotated to be fitted into the groove portion 25, the outside holding lip 15*l* is configured to be compressed and deformed into an arcuate shape the section of which is flat but displaced downward more as comes close to its tip end so that the outside holding lip 15*l* comes into pressure-contact on the inner surface 28. Accordingly, as shown in FIG. 2, the outside holding lip 15*l* shows a function of lifting the outside wall portion 15*c*, so that the aforementioned gap can be prevented from being produced after the attachment is completed. This reason will be explained below.

The tip end portion of the outside holding lip 15*l* of rubber has an initial contact point P1 with the inner surface 28 which is on a back surface of the molding 23 of high roughness. The contact point of the tip end portion of the outside holding lip 15*l* moves downward from the point P1 against the frictional resistance. Then, at a final contact point P2, the outside holding lip 15*l* is bent arcuately. In accordance with the quantity of elastic deformation of the outside holding lip 15*l*, pressing force F1 acts on the inner surface 28 of the groove portion 25 obliquely downward as shown in FIG. 2. By this pressing force F1 and the coefficient of friction between the molding 23 and the outside holding lip 15*l*, the tip end portion of the outside holding lip 15*l* receives large frictional resistance force at the final contact point P2, so as to be prevented from sliding downward.

On the other hand, the outside holding lip 15*l* receives frictional resistance while moving from the contact point P1 to the final contact point P2. Thus, the outside holding lip 15*l* itself is compressed arcuately. In accordance with the quantity of compression, the outside holding lip 15*l* further increases the obliquely downward pressing force F1 through the final contact point P2 as shown in FIG. 2. As a result, the outside wall portion 15*c* is lifted up by a vertical component F2*a* of counterforce F2 of this pressing force F1, so that the lock portion 15*j* can be brought into pressure-contact with the outer edge 26*a*. Thus, it is possible to prevent the aforementioned harmful gap from being produced.

(4) In the aforementioned embodiment, the inside holding lip 15*m* is provided on the outside surface at the base end of the inside wall portion 15*d* correspondingly to the bottom wall portion 15*b*. This inside holding lip 15*m* is pressed onto the inner surface 29 of the groove portion 25. In addition, the inside holding lip 15*m* is bent arcuately downward in the same manner as the outside holding lip 15*l*, so as to be pressed onto the inner surface 29 of the groove portion 25 by pressing force F3. Thus, also at a contact point P3 thereof, obliquely upward counterforce F4 acts thereon. As a result, the inside wall portion 15*d* is lifted up by a vertical component F4*a* of this counterforce F4, so that the inside holding lip 15*m* is held in a predetermined position stably.

When the lifting and holding lip 15*o* and the locked protrusion portion 15*p* climb over the terminal portion 31, the inside wall portion 15*d* and the extended inside wall portion 15*g* are lifted up. Therefore, the bent portion 15*f* is compressed temporarily so that the aforementioned contact point P3 of the inside holding lip 15*m* is lifted up to its maximum height. Then, even if the bent portion 15*f* is released from being compressed, the contact point P3 is not moved downward but held in a predetermined position by the frictional resistance force. Thus, the inside holding lip 15*m* is compressed toward the contact point P3 so as to show a function similar to that of the outside holding lip 15*l*.

A horizontal component F4*b* of the aforementioned counterforce F4 is balanced with a horizontal component F2*b* of the aforementioned counterforce F2. Thus, the bottom wall portion 15*b* is fixed between the car interior and exterior sides so as to be held in a predetermined position stably.

(5) In the aforementioned embodiment, the detachment preventing protrusion portion 15*k* is formed on the outside wall portion 15c of the body portion 15a of the glass run 15, so that the first gap G1 is formed between the detachment preventing protrusion portion 15k and the inner edge 26b of the folded portion 26. As a result, even if there is a dimensional error on manufacture in the distance W between the lock portion 15j and the detachment preventing protrusion portion 15k and the formation width D of the folded portion 26, there is no fear that the detachment preventing protrusion portion 15k interferes with the folded portion 26 when the body portion 15a is rotated to be fitted into the groove portion 25. It is therefore possible to perform the fitting operation smoothly.

(6) In the aforementioned embodiment, the second gap G2 is provided between the car-exterior-side bent portion 15e and the bottom wall surface 27, and the sealing lip 15n is formed on the car-exterior-side bent portion 15e. Accordingly, it is possible to prevent the car-exterior-side bent portion 15e from abutting against the bottom wall surface 27 to thereby cause the lock portion 15j to float from the outer edge 26a. In addition, the sound insulating performance is improved so that the vibration of the bottom wall portion 15b can be restrained.

Incidentally, the aforementioned embodiment may be modified as follows. In the following embodiments, only the vicinities of constituents different from those in the aforementioned embodiment are shown partially, but other not-shown constituents are similar to those in the aforementioned embodiment.

Figure 11:
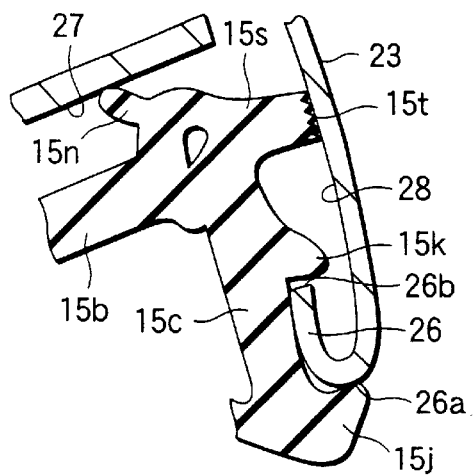
FIG. 11 shows a partially sectional view showing a second embodiment of the present invention.

As shown in a second embodiment shown in FIG. 11, a protrusion portion 15s may be formed as a pressure-contact portion in place of the aforementioned outside holding lip 15l, and a rough surface 15t may be formed in a tip end portion of the protrusion portion 15s. In this alternative embodiment, the rough surface 15t of the protrusion portion 15s is brought into pressure-contact with the inner surface 28 so that the outside wall portion 15c can be held in a predetermined position inside the groove portion 25 stably.

Figure 12:
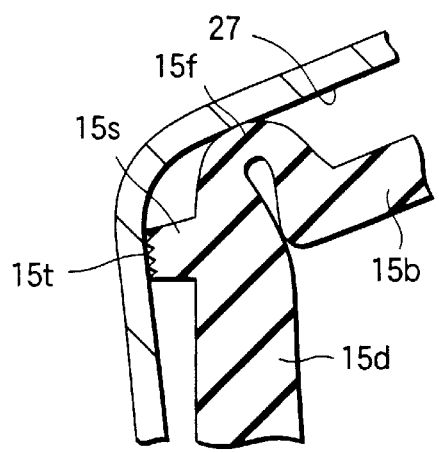
FIG. 12 shows a partially sectional view showing a third embodiment of the present invention.

As shown in a third embodiment in FIG. 12, the protrusion portion 15s and the rough surface 15t as described in FIG. 11 may be formed in place of the inside holding lip 15m.

Figure 13:
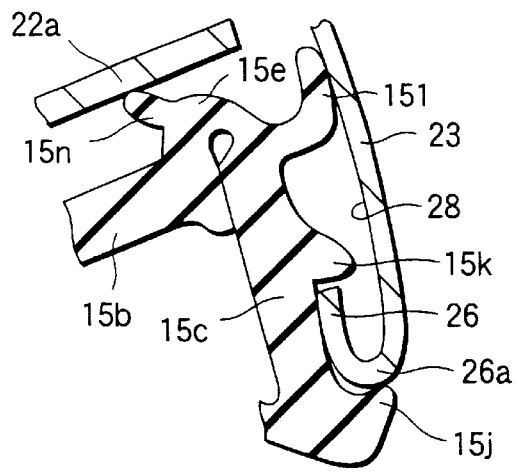
FIG. 13 shows a partially sectional view showing a fourth embodiment of the present invention.

As shown in a fourth embodiment shown in FIG. 13, the direction in which the outside holding lip 15l points may be changed to be apart from the detachment preventing protrusion portion 15k. In this alternative embodiment, the outside holding lip 15l is bent from the beginning so that the tip end portion of the outside holding lip 15l is in pressure-contact with the inner surface 28 perpendicularly thereto. Thus, the outside wall portion 15c can be held in its attachment position stably.

Though not illustrated, the structure may be embodied as a glass run for use in a rear door of a vehicle.

As has been described in detail, according to the invention, it is possible to perform the work of attaching a glass run to a window frame easily, and it is possible to hold the attachment state of the glass run stably.

In the event that outside and inside holding lips are elastically deformed to be brought into pressure-contact with inner wall surfaces of a groove portion, errors in manufacturing and attaching a body portion and the groove portion can be absorbed. Thus, the work of attachment can be performed easily.

In the event that an outside wall portion is urged toward a bottom wall surface of the groove portion in the state where the car-exterior-side outside holding lip is elastically deformed and compressed, the fitting state of the body portion can be held stably.

In the event that a rough surface is formed at least in a tip end portion of the outside holding lip, the frictional resistance force of the contact surface of the outside holding lip against the car-exterior-side wall inner surface of the groove portion is enhanced. Thus, the outside holding lip can be prevented from sliding.

In the event that a gap is provided between a car-exterior-side bent portion and the bottom wall surface, a lock portion provided at the outer edge of the outside wall portion can be locked in the car-exterior-side wall edge of the window frame properly.

In the event that the groove portion of the window frame is formed to be smaller in width than the distance between the tip end portions of pressure-contact portions, the pressure-contact portions are pressed onto the car-interior-side and car-exterior-side wall inner surfaces of the groove portion. Thus, the fitting state of the body portion can be held surely.

In the event that a gap is set between the detachment preventing protrusion portion and a lock step portion provided in the car-exterior-side wall inner surface of the groove portion, there is no fear that the detachment preventing protrusion portion interferes with the lock step portion when the body portion is rotated to be fitted into the groove portion even if there is a dimensional error in manufacturing and assembling the glass run and the groove portion. It is therefore possible to perform the work of attachment easily.

In the event that a lifting and holding lip provided on the extended inside wall portion is pressed onto a receiving portion so that the extended inside wall portion and the inside wall portion are pushed up, the fitting state of the body portion can be held stably. In addition, a locked protrusion portion is locked by the terminal portion of the garnish so that the extended inside wall portion can be held in a predetermined position stably.

A fifth embodiment of the present invention will be described below with reference to FIGS. 14A, 14B and 15.

Figure 14A:
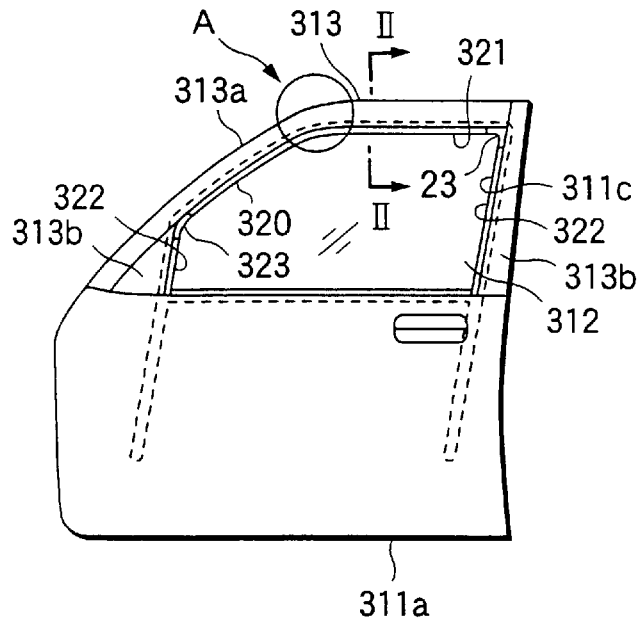
FIG. 14A shows a side view of a front door having a sealing structure according to the present invention.
Figure 14B:
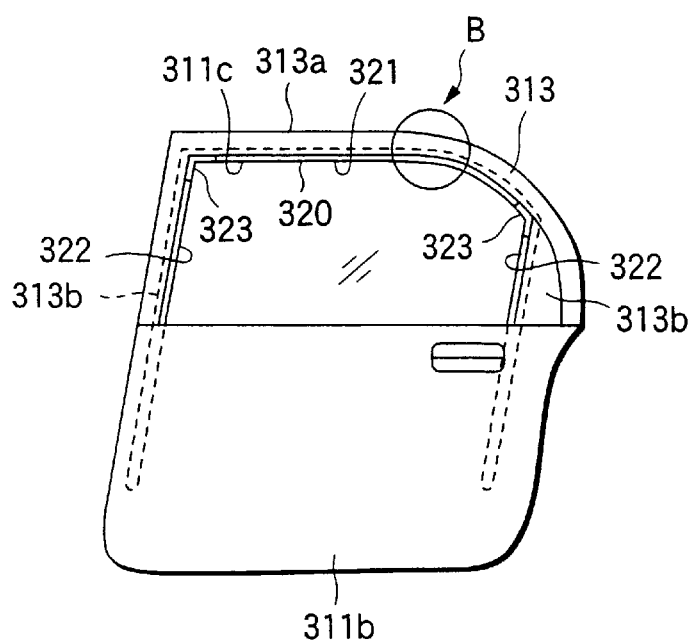
FIG. 14B shows a side view of a rear door similar thereto.
Figure 15:
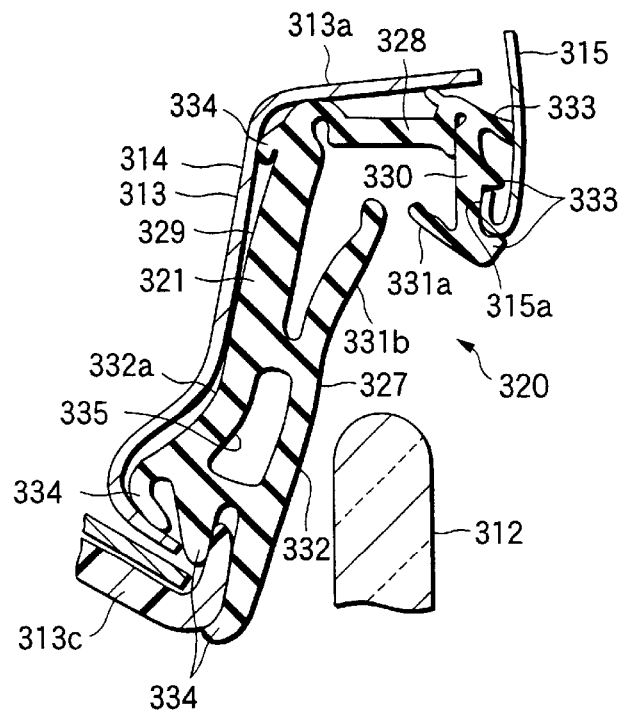
FIG. 15 shows a sectional view taken on line II—II in FIG. 14A, which shows a fifth embodiment of the present invention.

As shown in FIGS. 14A and 14B and FIG. 15, a window opening portion 311c which is opened and closed by a window glass 312 is provided in each of a front door 311a acting as a vehicle front portion door and a rear door 311b acting as a vehicle rear portion door. A window frame 313 is formed to go along the upper portion and the opposite side portions of the window portion 311c and to enter the inside of the door 311a or 311b. This window frame 313 is, for example, formed into a substantially U-shape in section as a whole, in which an inner reinforce 314 and a molding 315 which are made of metal are bent into predetermined shapes respectively so as to form parts of the door 311a and 311b. In this window frame 313, a glass run 320, which is formed of rubber such as ethylene-propylene-diene terpolymer (EPDM) or the like, is attached to the window frame 313 along a horizontal frame portion 313a and vertical frame portions 313b thereof.

This glass run 320 is constituted by a first extrusion-molded portion 321 disposed along the horizontal frame portion 313a of the window frame 313, and second extrusion-molded portions 322 disposed along the vertical frame portion 313b of the window frame 313. Then, extrusion-molded portions 321 and 322 are connected with each other. The extrusion-molded portions 321 and 322 are formed by a known extrusion molding method and cut into predetermined lengths, respectively. On the other hand, the molded portions 323 are formed by use of a known injection molding method, correspondingly to the corner portions of the window frame 313, respectively. Then, these respective molded portions 321 to 323 are connected and integrated with one another so as to be formed into a substantially U-shape in plan view in the state where they are disposed in their predetermined positions.

As shown in FIG. 15, in the aforementioned extrusion-molded portions 321, 322 and 323, a body portion 327 having a substantially U-shape in section is formed in the middle. This body portion 327 is constituted by a bottom wall portion 328 and a pair of side wall portions extending substantially vertically from the opposite ends of the bottom wall portion 328, that is, a car-interior-side inside wall portion 329 and a car-exterior-side outside wall portion 330.

From the forward end of the aforementioned car-exterior-side outside wall portion 330, a glass seal portion 331a is formed to project toward the bottom wall portion 328. On the other hand, a glass seal portion 331b is formed in the car-interior-side inside wall portion 329 so as to project from a substantially central portion thereof toward the bottom wall portion 328. An extended inside wall portion 332 is formed between the forward end portion of the inside wall portion 329 and the base end portion of the glass seal portion 331b. These glass seal portions 331a and 331b are designed to elastically abut against the inside and outside surfaces of the window glass 312 respectively. The glass seal portions 331a and 331b guide the window glass 312 in the glass run 320 so that the window glass 312 can move up and down slidably on the glass seal portions 331a and 331b, while the glass seal portions 331a and 331b have a function of sealing off the car interior side from the car exterior side in the state where the window glass 312 is closed.

Outside holding lips 333 extending outward are formed in the base portion, the central portion and the forward end portion of the outside wall portion 330. Parts of the car-exterior-side holding lips 333 are designed to engage with a folded portion 315a formed and folded in the molding 315 constituting a part of the window frame 313 when the glass run 320 is attached to the window frame 313. In addition, car-interior-side holding lips 334 are formed near the forward end of the inside wall portion 329 so that parts of the car-interior-side holding lips 334 extend inward. The car-interior-side holding lips 334 are designed to engage with the inner reinforce 314, and parts of holding lips 334 are designed to catch a terminal portion of a garnish 313c which is provided to the window frame 313. By the engagement and catch of the holding lips 333 and 334, the body portion 327 of the glass run 320 is held in the window frame 313.

In this embodiment, as shown in FIGS. 14A and 14B and FIG. 15, a hollow portion 335 as shock absorbing means is formed in a position of the glass run 320 corresponding to the horizontal frame portion 313a which is an upper portion of the window frame 313, that is, in the car-interior-side inside wall portion 329 of the first extrusion-molded portion 321. In detail, this hollow portion 335 is formed in the extended inside wall portion 332 of the first extrusion-molded portion 321. For example, the hollow portion 335 can be formed at the same time as the first extrusion-molded portion 321 is extrusion-molded.

Therefore, according to this embodiment, it is possible to obtain the following effects.

(1) When the door 311a or 311b is closed hard in the state where the window glass 312 is moved down slightly so that the upper end portion of the window glass 312 is detached from the glass seal portions 331a and 331b in the region of the glass run 320, the upper end portion of the window glass 312 is shaken toward the car-interior-side inside wall portion 329 of the glass run 320 by the inertia force, so as to collide with the extended inside wall portion 332 of the glass run 320. On the other hand, in this glass run 320, the hollow portion 335 is provided in the extended inside wall portion 332 of the inside wall portion 329 in the first extrusion-molded portion 321 disposed in the upper portion of the glass run 320. The existence of the hollow portion 335 allows the extended inside wall portion 332 to be elastically deformed by the collision of the window glass 312 therewith. Thus, the shock when the window glass 312 collides with the extended inside wall portion 332 is absorbed. It is therefore possible to effectively reduce a collision sound caused by this collision.

(2) In this glass run 320, the hollow portion 335 is merely formed in the car-interior-side inside wall portion 329 of the first extrusion-molded portion 321 as a structure for absorbing a collision sound. Therefore, the effect stated in the paragraph (1) can be attained with a simple structure.

(3) In this glass run 320, the hollow portion 335 in the car-interior-side inside wall portion 329 is provided in the first extrusion-molded portion 321 disposed in the upper portion of the glass run 320.

Accordingly, when the door 311a or 311b is closed hard, the glass run 320 having the hollow portion 335 is located in a position corresponding to the front end upper portion of the front door 311a or the rear end upper portion of the rear door 311b where the upper end portion of the window glass 312 is shaken the largest. Therefore, the collision sound generated by the collision between the window glass 312 and the glass run 320 can be reduced more effectively.

(4) In this glass run 320, the hollow portion 335 exists inside the extended inside wall portion 332 so that it is possible to restrain the external appearance of the vehicle from being spoiled.

Next, a sixth embodiment of the present invention will be described in concentration on the portions in which the sixth embodiment differs from the fifth embodiment.

Figure 16:
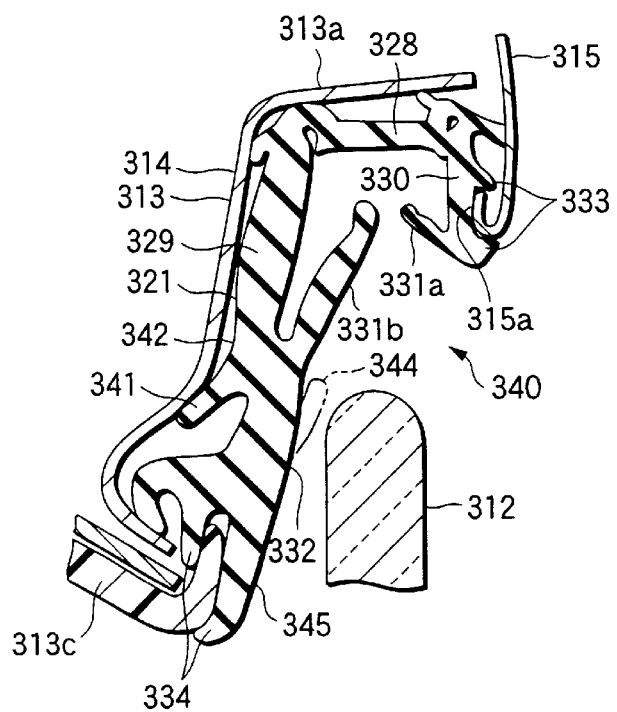
FIG. 16 shows a sectional view of a sealing structure according to a sixth embodiment.

In this sixth embodiment, as shown in FIG. 16, a shock absorbing lip 341 as shock absorbing means is formed to project in a position of a glass run 340 corresponding to the horizontal frame portion 313a which is an upper portion of the window frame 313, that is, on a car-interior-side inside wall portion 329 of a first extrusion-molded portion 321. In detail, this shock absorbing lip 341 is formed on a car-interior-side surface 342 of an extended inside wall portion 332 of the first extrusion-molded portion 321. The shock absorbing lip 341 is designed to elastically abut against the inner circumferential surface of the window frame 313, that is, the inner reinforce 314 in the state where the glass run 340 is attached to the window frame 313. The shock absorbing lip 341 can be, for example, formed at the same time as the first extrusion-molded portion 321 is extrusion-molded.

Therefore, according to this embodiment, the following effects can be obtained in addition to effects substantially similar to the aforementioned effects (2) and (3) of the fifth embodiment.

(5) In this glass run 340, the shock absorbing lip 341 is provided in the extended inside wall portion 332 of the car-interior-side inside wall portion 329.

Accordingly, the shock generated when the window glass 312 collides with the glass run 340 is absorbed by the elastic deformation of the shock absorbing lip 341. Thus, the collision sound generated by this collision can be reduced effectively.

(6) In this glass run 340, the shock absorbing lip 341 is provided on the car-interior-side surface 342 of the extended inside wall portion 332. Accordingly, it is possible to restrain the external appearance of the vehicle from being spoiled.

The sixth embodiment was arranged so that the shock absorbing lip 341 was formed on the car-interior-side surface 342 of the extended inside wall portion 332 of the glass run 340. Alternatively, as shown by the two-dotted chain line in FIG. 16, a shock absorbing lip 344 may be formed on a car-exterior-side surface 345 of the extended inside wall portion 332. Here, this shock absorbing lip 344 has to be provided substantially in parallel with the glass seal portion 331b so as not to prevent the window glass 312 from moving up and down. In addition, the shock absorbing lips 341 and 344 may be formed on both the side surfaces 342 and 345 of the extended inside wall portion 332, respectively. In such cases, it is possible to obtain effects substantially similar to the aforementioned effects (2), (3) and (6).

Next, a seventh embodiment of the present invention will be described in concentration on the portions in which the seventh embodiment differs from the fifth and sixth embodiments.

Figure 17A:
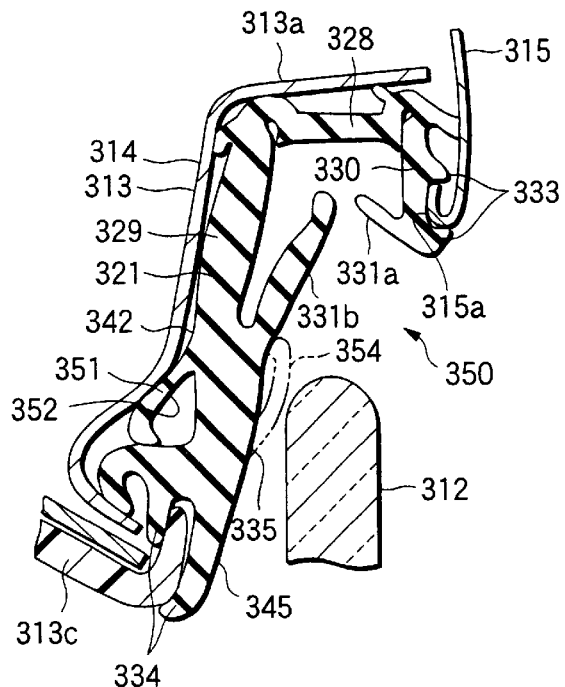
FIG. 17A shows a sectional view showing a state where a glass run has been assembled in a sealing structure according to a seventh embodiment.
Figure 17B:
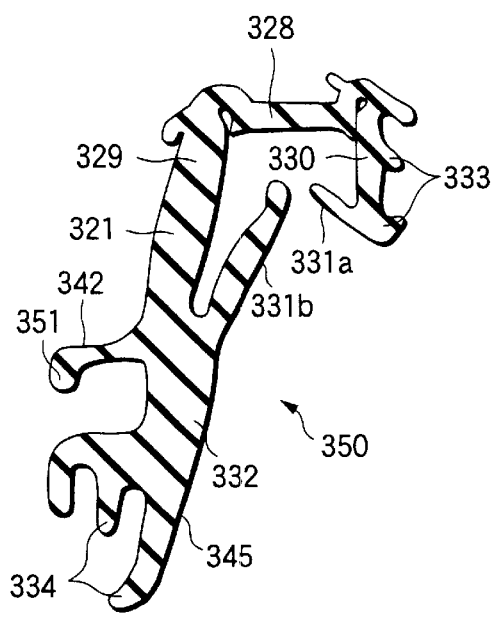
FIG. 17B shows a sectional view showing the glass run in a free state.

In this seventh embodiment, as shown in FIGS. 17A and 17B, a shock absorbing lip 351 as shock absorbing means is formed to project on a car-interior-side inside wall portion 329 of a first extrusion-molded portion 321 of a glass run 350. In detail, this shock absorbing lip 351 is formed on a car-interior-side surface 342 of an extended inside wall portion 332 of the first extrusion-molded portion 321.

The shock absorbing lip 351 is formed to be higher than the aforementioned shock absorbing lip 341 in the sixth embodiment. The shock absorbing lip 351 is designed to elastically abut against the inner circumferential surface of the window frame 313, that is, the inner reinforce 314 in the state where the glass run 350 is attached to the window frame 313. Then, the forward end portion of the shock absorbing lip 351 is provided to be released when the glass run 350 is in a free state (FIG. 17B), and to abut against the car-interior-side surface 342 of the car-interior-side inside wall portion 329 so as to form a hollow portion 352 when the glass run 350 is attached (FIG. 17A).

Therefore, according to this embodiment, the following effects can be obtained in addition to effects similar to the aforementioned effects (1) to (6) of the aforementioned respective embodiments.

(7) In this glass run 350, by attaching the glass run 350 to the window frame 313, the hollow portion 352 is formed in the extended inside wall portion 332 of the car-interior-side inside wall portion 329.

Accordingly, the glass run 350 having the hollow portion 352 in the extended inside wall portion 332 can be manufactured with a simple mold structure without using any core or the like in dies for extrusion-molding the glass run 350. It is therefore possible to reduce the cost of the dies for manufacturing the glass run 350, so that it is possible to reduce the cost of manufacturing the glass run 350.

Also in the seventh embodiment, in the same manner as in the aforementioned sixth embodiment, as shown by the two-dotted chain line in FIG. 17A, a shock absorbing lip 354 may be formed on a car-exterior-side surface 345 of the extended inside wall portion 332. In addition, the shock absorbing lips 354 may be formed on both the side surfaces 342 and 345 of the extended inside wall portion 332. In such cases, it is possible to obtain effects similar to the aforementioned effects (1) to (3), (5) and (7).

Next, an eighth embodiment of the present invention will be described in concentration on the portions in which the eighth embodiment differs from the aforementioned respective embodiments.

Figure 18:
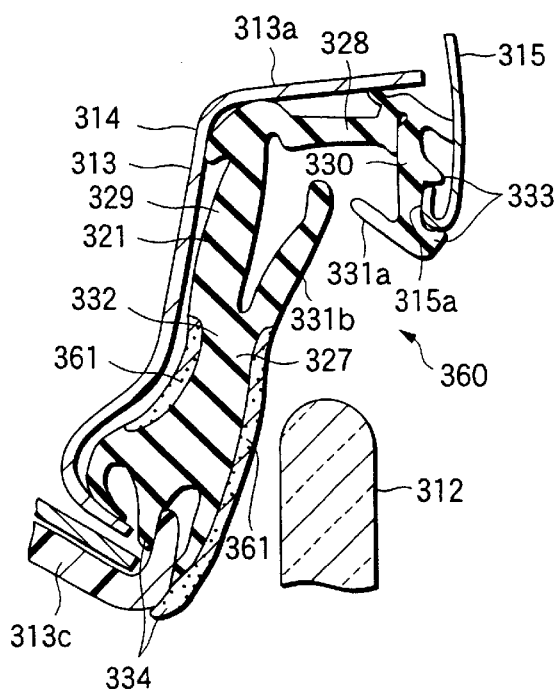
FIG. 18 shows a sectional view of a sealing structure according to an eighth embodiment.

In this eighth embodiment, as shown in FIG. 18, a sponge layer 361 as shock absorbing means is formed on a car-interior-side inside wall portion 329 of a first extrusion-molded portion 321 of a glass run 360. In detail, this sponge layer 61 is formed integrally with both side surfaces 342 and 345 of an extended inside wall portion 332 of the first extrusion-molded portion 321. Then, the sponge layer 361 on the car-exterior-side surface 345 is formed up to the vicinity of the forward end portion of a car-interior-side holding lip 334. Further, for example, this sponge layer 361 can be molded by a known two-layer extrusion molding method at the same time as the first extrusion-molded portion 321 is extrusion-molded.

Therefore, according to this embodiment, the following effects can be obtained in addition to effects substantially similar to the aforementioned effects (2) and (3) of the aforementioned respective embodiments.

(8) In this glass run 360, the sponge layer 361 is provided on both the side surfaces 342 and 345 of the car-interior-side inside wall portion 329 so as to absorb the shock when the window glass 312 collides with the glass run 360 and when this collision causes the glass run 360 to collide with the inner surface of the window frame 313. Thus, a collision sound generated by such collision can be reduced effectively.

(9) In this glass run 360, the sponge layer 361 is formed up to the vicinity of the forward end portion of the car-interior-side holding lip 34 of the car-interior-side inside wall portion 329.

Accordingly, even if the window glass 312 collides with the glass run 360 at a position near the car-interior-side holding lip 334, a collision sound generated by the collision can be reduced.

Incidentally, the eighth embodiment of the present invention may be modified as follows.

Although the sponge layer 361 was designed to be formed on both side surfaces 342 and 345 of the extended inside wall portion 332 in the eighth embodiment, this sponge layer 361 may be designed to be formed on one of the side surfaces of the extended inside wall portion 332. In such a case, it is possible to obtain effects substantially similar to the aforementioned effects (2), (3), (8) and (9).

Next, a ninth embodiment of the present invention will be described in concentration on the portions in which the ninth embodiment differs from the aforementioned respective embodiments.

Figure 19A:
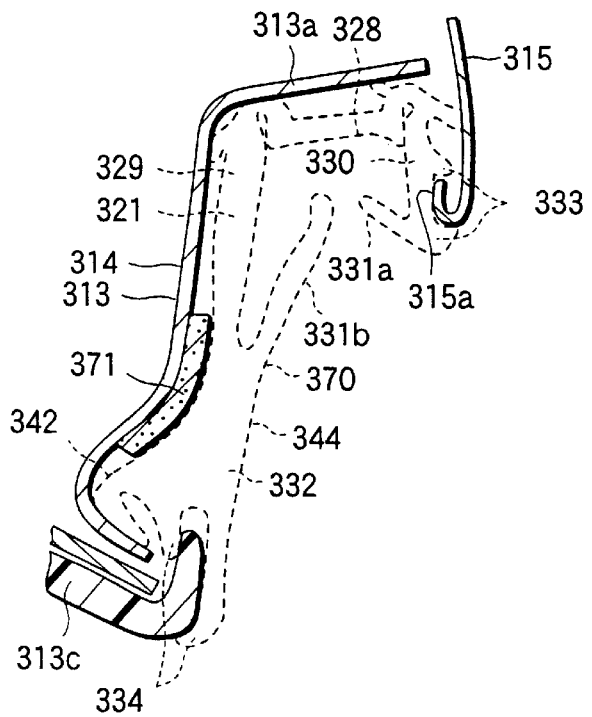
FIG. 19A shows a sectional view of a sealing structure according to a ninth embodiment.

In this ninth embodiment, as shown in FIG. 19A, a sponge member 371 as shock absorbing means is bonded onto the inner surface of the horizontal frame portion 313a of the window frame 313, that is, onto a portion of the inner reinforce 314 corresponding to a car-interior-side inside wall portion 329 of a first extrusion-molded portion 321 of a glass run 370.

Therefore, according to this embodiment, the following effects can be obtained in addition to effects substantially similar to the aforementioned effects (2) and (3) of the aforementioned respective embodiments.

(10) In this sealing structure, the sponge member 371 is bonded onto a portion of the window frame 313 corresponding to the extended inside wall 332 of the glass run 370. As a result, the shock generated by the collision between the window glass 312 and the glass run 370 is absorbed by the sponge member 371. Thus, a collision sound generated by the collision can be reduced effectively.

(11) In addition, this sponge member 371 can be set desirably as to its bonded position, shape and size.

Accordingly, the sponge member 371 can be bonded, with a high degree of freedom, onto a required portion such as a portion A shown in FIG. 14A in the front door 311a or a portion B shown in FIG. 14B in the rear door 311b, particularly, a portion where the relative movement quantity of the window glass 312 becomes large.

Further, a common sponge member 371 can be used regardless of the shapes of the glass run 370 and the window frame 313.

Incidentally, the ninth embodiment of the present invention may be modified as follows.

Figure 19B:
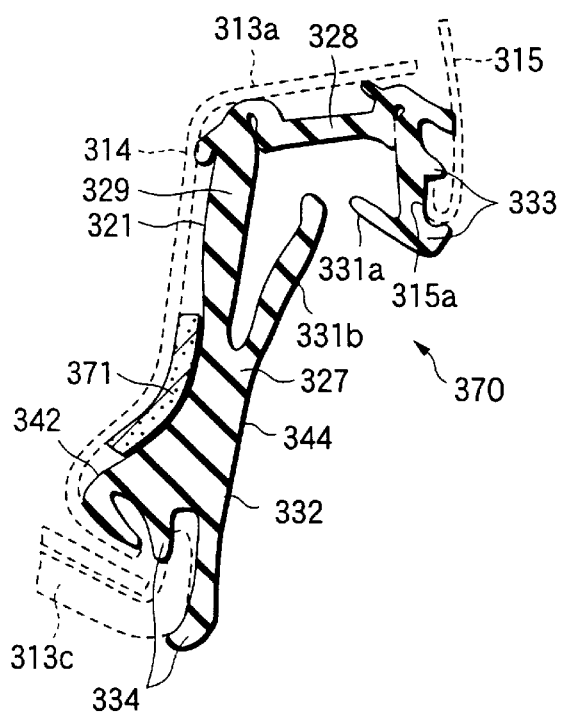
FIG. 19B shows a sectional view showing a modification example thereof.

The sponge member 371 was bonded onto the inner reinforce 314 constituting a portion of the window frame 313 in the ninth embodiment. Alternatively, the sponge member 371 may be bonded onto the car-interior-side surface 342 of the extended inside wall portion 332 of the car-interior-side inside wall portion 329 in the first extrusion-molded portion 321 of the glass run 370, as shown in FIG. 19B.

In such a case, it is possible to obtain the following effects in addition to the effects substantially similar to the aforementioned effects (2), (3) and (10).

(12) In this sealing structure, the sponge member 371 is bonded onto the car-interior-side inside wall portion 329 of the glass run 370. Accordingly, the work of bonding the sponge member 371 is so easy that it is possible to restrain the labor of a worker from increasing at the time of the work of assembling the glass run 370.

Although the sponge member 371 was designed to be bonded correspondingly to the car-interior-side surface 342 of the extended inside wall portion 332 in the ninth embodiment, this sponge member 371 may be pasted correspondingly to the car-exterior-side surface 345 of the extended inside wall portion 332. Alternatively the sponge member 371 may be designed to be bonded onto both side surfaces 342 and 345.

Further, the respective embodiments of the present invention may be modified as follows.

Although the glass runs 320, 340, 350, 360 and 370 were made of rubber in the respective embodiments, the present invention is not limited to this. For example, the present invention may be carried out with a glass run which is made of thermoplastic elastomer such as thermoplastic olefin elastomer (TPO) or the like, soft synthetic resin such as soft polyvinyl chloride or the like, or a polymer blend of such polymers. Even with such a structure, effects corresponding to those stated in the respective embodiments can be obtained.

Although the respective shock absorbing means (the hollow portion 335, the shock absorbing lips, 341, 344, 351 and 354, the sponge layer 361, and the sponge member 371) had shapes and numbers as shown in FIGS. 15 to 19 in the respective embodiments, the shapes and numbers of these respective shock absorbing means are optional. The shapes and numbers of them may be changed suitably in accordance with the dimensions, shapes, etc. of the glass runs 320, 340, 350, 360, and 370, respectively.

Although the respective shock absorbing means were provided on the car-interior-side inside wall portion 329 in the respective embodiments, these shock absorbing means may be designed to be provided on the car-exterior-side inside wall portion 330. Further, the respective shock absorbing means may be provided on one or both of the side surfaces of the car-exterior-side inside wall portion 330.

Although the respective shock absorbing means were designed to be provided in both the front door 311a and the rear door 311b in the respective embodiments, the respective shock absorbing means may be designed to be provided in one of the front door 311a and the rear door 311b.

Although the glass runs 320, 340, 350, 360 and 370 were designed to have the extended inside wall portion 332 in the respective embodiments, each glass run may be designed to have no extended inside wall portion 332. Further, the present invention may be carried out with a glass run having an extended inside wall portion 332 on a car-exterior-side nside wall portion 330. With such a structure, effects corresponding to those stated in the respective embodiments can be obtained.

As has been described above, according to the invention, it is possible to reduce a collision sound generated when the upper edge of the window glass collides with a side wall portion of a glass run in the state where a window glass is moved down slightly.

Further, according to the invention, when the window glass is moved down slightly, it is possible to reduce a collision sound effectively, particularly in a sealing structure having a glass run which is apt to be detached from the glass seal portion in the region of the glass run.

Further, in addition to the effect of the above invention, it is possible to reduce a collision sound more effectively in a portion where the quantity of movement of the window glass increases.

According to the invention, the effect of the invention can be attained with a simple structure.

According to the invention, in addition to the effect of the invention, a glass run in which a hollow portion is provided in the inside wall portion can be realized with a simple mold structure.

Further, according to the invention, even if the window glass collides with the lower end of the inside wall portion of the glass run, the collision sound generated by the collision can be reduced.

Further, according to the invention, a collision sound can be reduced more surely and effectively by adjusting the size and bonded position of the sponge member. Further, it is possible to use a common sponge member regardless of the shapes of the glass run and the window frame. In addition, when the sponge member is bonded onto the inside wall portion of the glass run, it is possible to restrain the labor of a worker from increasing at the time of the work of assembling the glass run.

Figure 20:
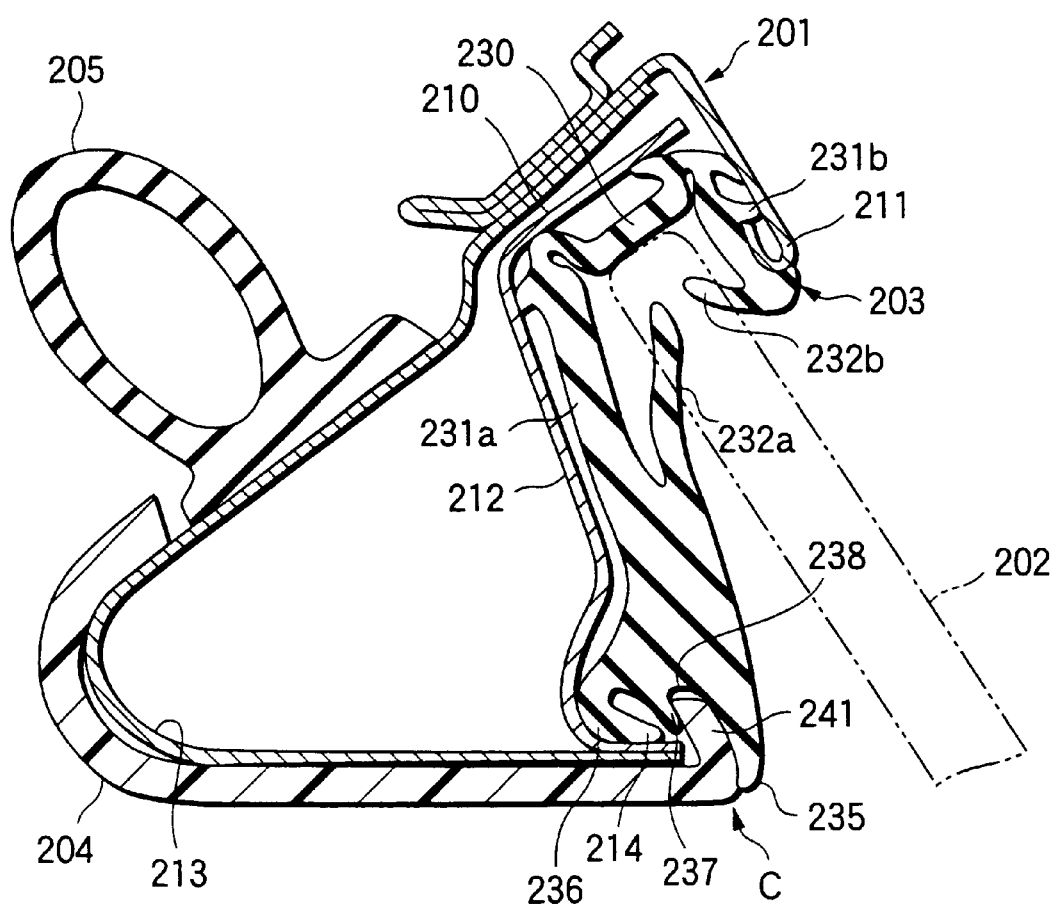
FIG. 20 shows a sectional view of a glass run attachment structure according to a tenth embodiment of the present invention, which is taken on line A—A in FIG. 21.
Figure 21:
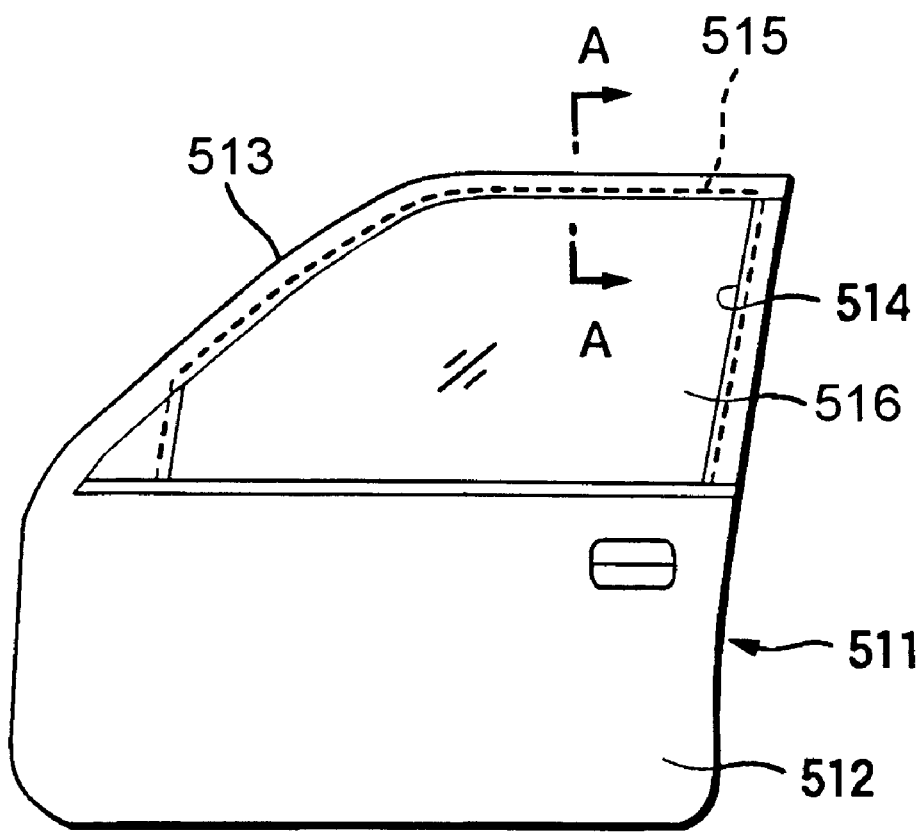
FIG. 21 shows a sectional view of an automotive door on which a glass run is mounted.
Figure 22:
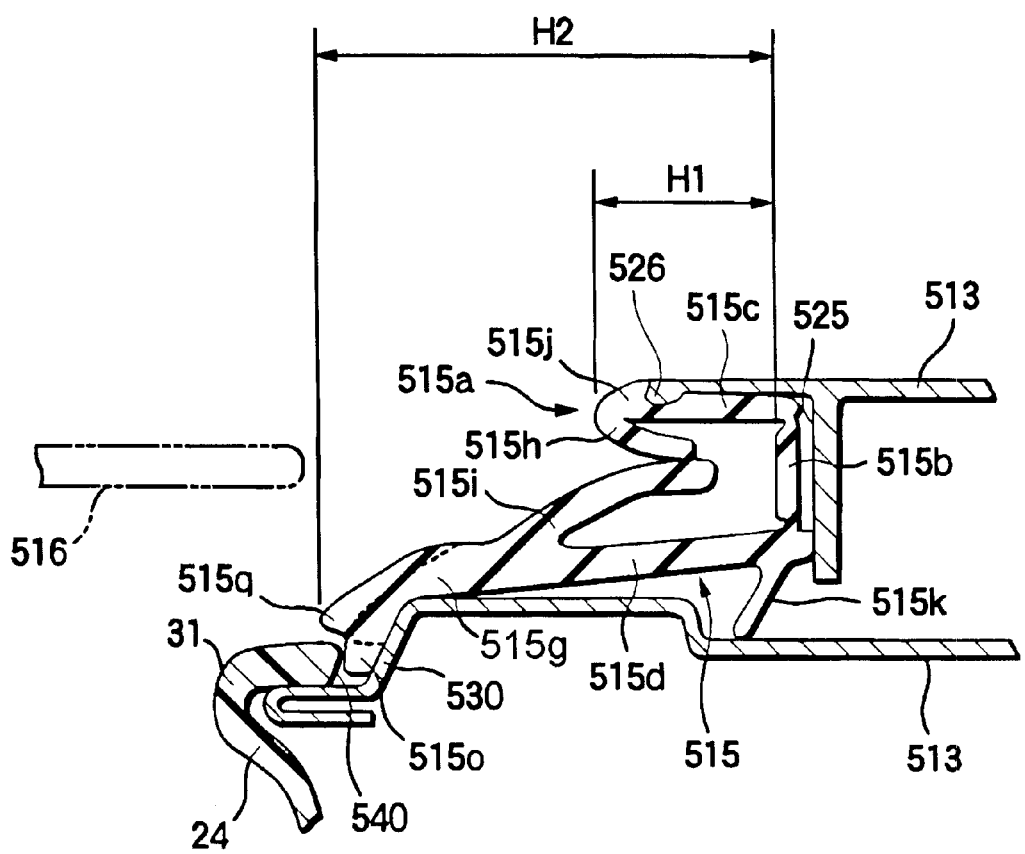
FIG. 22 shows a sectional view showing a conventional structure for attaching a glass run, which is taken on line A—A in FIG. 21.

FIG. 20 shows a tenth embodiment of the present invention. A glass run 203 is an extrusion-molded body of rubber or thermoplastic olefin elastomer. The glass run 203 is provided with a body portion 230 having a substantially U-shape in section, and seal lips 232a and 232b extending from opposite side walls 231a and 231b of the body portion 230 toward the inside of the body portion 230 respectively. The car-interior-side inside wall 231a is thicker and longer than the car-exterior-side outside wall 231b, and is formed to be thicker particularly on its forward end side. The seal lip 232a extends from the middle portion of the car-interior-side inside wall 231a so as to face the seal lip 232b which extends from the forward end of the car-exterior-side outside wall 231b. Then, the seal lip 232a does not always extend from the middle portion of the car-interior-side inside wall 231a, but it may be made to extend from another position, for example, from the lower end portion of the car-interior-side inside wall 231a, and it has not to be made opposite to the seal lip 232b.

On the other hand, the door frame 201 is constituted by an outer frame panel 211 which forms the outer circumferential surface of the door frame 201, an inner reinforce 212 which forms a groove, and an inner frame 213 which forms the car-interior-side side surface of the door frame 201. The inner reinforce 212, together with the outer frame 211, forms a section of a substantially U-shape. The groove portion 210 is designed to have a sectional shape corresponding to the body portion 230 of the glass run 201. The aforementioned inner frame 213 has a substantially U-shape in section, which projects toward the car interior side. In addition, the lower edge of the inner frame 213 is welded with the lower surface of a receiving portion 214 which is formed by bending the lower end of the panel 212 of the door frame 201 into an L-shape toward the inside of the groove 210. The inner frame 213 is covered with a garnish 204 which has substantially the same sectional shape as the inner frame 213 and which is composed of synthetic resin.

The glass run 203 is attached by fitting the body portion 230 thereof into the groove 210 of the door frame 201, so that the seal lips 232a and 232b hold the outer circumferential portion of a door glass 202 from the opposite surfaces thereof.

The thickness of the car-interior-side inside wall 231a of the glass run 203 is made thicker at its forward end where a lip portion (hereinafter, referred to as "first lip portion") 235 is formed to extend from a position along the inside surface of the inside wall portion 231a of the glass run 203. When the glass run 203 is attached to the door frame 201, the front portion of the receiving portion 214 formed at the opening end of the door frame 201 is covered with the lip portion 235 at a slight distance therefrom, and the lip portion 235 under (outside) the receiving portion 214 further extends up to the vicinity of the lower surface of the garnish 204. The lip portion 235 is tapered, and the forward end portion thereof is bent toward the receiving portion 214 in its natural state.

In addition, another lip portion (hereinafter, referred to as "second lip portion") 236 different from the first lip portion 235 is formed at the forward end of the car-interior-side inside wall 231a so as to extend downward from a position along the outside surface of the inside wall 231a. The second lip portion 236 is made shorter and thinner than the first lip portion 235. Thus, the second lip portion 236 is easy to bend. A protrusion portion 237 like a low mountain is formed at the forward end of the inside wall 231a between the lip portions 235 and 236, so that a recess groove 238 is formed between the protrusion portion 237 and the root portion of the first lip portion 235.

When the glass run 203 is attached by fitting the body portion 230 thereof into the groove portion 210 of the door frame 201, it is inevitable to produce a gap between the forward end surface of the car-interior-side inside wall 231a of the glass run 203 and the receiving portion 214 at the car-interior-side wall opening end of the groove portion 210. The distance of this gap scatters due to the variation in length between the inside wall 231a of the glass run 203 and the car-interior-side side surface portion of the groove portion 210, the scattering in attachment of the glass run 203, and so on. However, the aforementioned gap is absorbed by the second lip portion 236 which is bent to press onto the receiving portion 214, while the forward end of the inside wall 231a of the glass run 203 is supported by the receiving portion 214 through the second lip portion 236.

The terminal portion of the garnish 204 is moved along the lower surface of the inner frame 213 of the door frame 201 as shown by the arrow C in FIG. 20, and the rising terminal portion 241 is lifted up along the first lip portion 235, and fitted in between the first lip portion 235 and the forward edge of the receiving portion 214 so as to forcedly open the first lip portion 235. Further, the upper end of the rising terminal portion 241 is fitted into the recess groove 238 inside the root of the first lip portion 235. Thus, the terminal portion of the garnish 204 is locked.

In this case, because the first lip portion 235 extends downward below the forward edge of the receiving portion 214, there is no fear that the first lip 235 is bitten between the forward edge of the receiving portion 214 and the rising terminal portion 241 of the garnish 204.

According to the present invention, termination treatment between the forward end of a car-interior-side inside wall of a glass run and the terminal portion of a garnish covering the inner frame of a door frame is performed accurately and with a good workability. In addition, since a lip portion is formed to come into elastic contact with the opening end of a groove portion of the door frame so as to be supported by the opening end, the forward end of the aforementioned inside wall is held stably, and hence the terminal portion of the garnish locked at the forward end of the inside wall is also held stably without shaking.

The structures of all embodiments can be combined without limitation.

The present invention is not limited to the mode for carrying out the invention and the embodiment thereof at all, and includes various modifications that can be conceived easily by those skilled in the art, without departing from the scope of claim.

What is claimed is:

1. A glass run attachment structure for attaching a glass run to a window frame of a vehicle, said glass run having a channel-shaped body portion corresponding to a groove portion formed in said window frame, wherein said channel-shape body portion having an outside wall portion, a bottom wall portion and an inside wall portion, and said groove portion having a car-exterior-side wall and a car-interior-side wall, said structure comprising:

a lock portion formed in an end portion of said outside wall portion;

a detachment preventing protrusion portion formed on an outside wall surface of said outside wall portion; and at least two pressure-contact portions respectively provided on base end portions of said outside wall portion and said inside wall portion corresponding to both ends of said bottom wall portion so as to be brought into pressure-contact with a car-exterior-side wall inner surface and a car-interior-side wall inner surface of said groove portion of said window frame, wherein said inside wall portion is larger than said outside wall portion, wherein said lock portion is brought into contact with a car-exterior-side outer edge of said window frame, while said body portion of said glass run is rotated around said lock portion so as to be fitted into said groove portion, wherein said pressure-contact portions include holding lip and an inside holding lip which are elastically deformed when said body portion of said glass run is rotated to be fitted into said groove portion, wherein said groove portion of said window frame is formed so that a width thereof is smaller than a distance between tip end portions of said inside and outside holding lips when said glass run is not fitted into said groove portion.

2. A glass run attachment structure according to claim 1, wherein compression-direction force is given to at least said outside holding lip, when said outside and inside holding lips are elastically deformed, and said body portion is urged toward a bottom side of said groove portion by compression-direction restoring force of said outside holding lip after said body portion is fitted into said groove portion.

3. A glass run attachment structure according to claim 1, wherein a rough surface is formed in a tip end portion of at least said outside holding lip.

4. A glass run attachment structure according to claim 1, wherein said body portion further comprises car-exterior-side and car-interior-side bent portions for respectively coupling said outside wall portion or said inside wall portion and said bottom wall portion, and is extruded as a whole so that both of said outside wall portion and said inside wall portion are developed with respect to said bottom wall portion, a gap is established between an outer surface of said car-exterior-side bent portion and a bottom wall surface of said groove portion, said car-interior-side bent portion is brought into pressure-contact with said bottom wall surface, and a sealing lip is provided on said car-exterior-side bent portion so as to abut against said bottom wall surface.

5. A glass run attachment structure according to claim 1, wherein a gap is established between said detachment preventing protrusion portion and a lock step portion provided in said car-exterior-side wall inner surface of said groove portion.

6. A glass run attachment structure for attaching a glass run to a window frame of a vehicle, said glass run having a channel-shaped body portion corresponding to a groove portion formed in said window frame, wherein said channel-shaped body portion having an outside wall portion, a bottom wall portion and an inside wall portion, and said groove portion having a car-exterior-side wall and a car-interior-side wall, said structure comprising:

a lock portion formed in an end portion of said outside wall portion;

a detachment preventing protrusion portion on an outside wall surface of said outside wall portion; and at least two pressure-contact portions respectively provided on base end portions of said outside wall portion and said inside wall portion corresponding to both ends of said bottom wall portion so as to be brought into pressure-contact with a car-exterior-side wall inner surface and a car-interior-side wall inner surface of said groove portion of said window frame, wherein said inside wall portion is larger than said outside wall portion, wherein said lock portion is brought into contact with a car-exterior-side outer edge of said window frame, while said body portion of said glass run is rotated around said lock portion so as to be fitted into said groove portion, wherein said pressure-contact portions include an outside holding lip and an inside holding lip which are elastically deformed when said body portion of said glass run is rotated to be fitted into said groove portion, wherein a receiving portion is formed as a lock portion in an inner circumference of an inner reinforce which constitutes said window frame, a terminal portion is formed as a lock portion in a garnish, and a lifting and holding lip is provided on an extended inside wall portion of said glass run so as to be brought into pressure-contact with said receiving portion, while a lock protrusion portion is formed as a locked portion which is to be locked by said terminal portion.

7. A glass run attachment structure for attaching a glass run to a window frame of a vehicle, said glass run having a channel-shaped body portion corresponding to a groove portion formed in said window frame, wherein said channel-shaped body portion having an outside wall portion, a bottom wall portion and an inside wall portion, and said groove portion having a car-exterior-side wall and a car-interior-side wall, said structure comprising:

a lock portion formed in an end portion of said outside wall portion;

a detachment preventing protrusion portion formed on an outside wall surface of said outside wall portion;

at least two pressure-contact portions respectively provided on base end portions of said outside wall portions and said inside wall portion corresponding to both ends of said bottom wall portion so as to be brought into pressure-contact with a car-exterior-side wall inner surface and a car-interior-side wall inner surface of said groove portion of said window frame; and a garnish covering a car-interior-side surface of said window frame, a terminal portion of said garnish being brought into close contact with a forward end of said inside wall portion of said glass run, wherein said inside wall portion is larger than said outside wall portion, wherein said lock portion is brought into contact with a car-exterior-side outer edge of said window frame, while said body portion of said glass run is rotated around said lock portion so as to be fitted into said groove portion, wherein said inside wall portion has a second lip portion formed at said forward at said forward end so as to extend from said forward end down below a car-interior-side wall opening of said groove portion of said window frame, and said terminal portion of said garnish is fitted in between said second lip portion and said car-interior-side wall opening end.

8. A glass run attachment structure according to claim 7, wherein a receiving portion is formed at an opening end of said groove portion, and said second lip portion is made to extend down below said receiving portion, and wherein a third lip portion is formed at said forward end of said inside wall portion of said glass run so as to be closer to an outside surface of said side wall than said second lip portion and to extend from said forward end of said inside wall portion to thereby press on said receiving portion when said glass run is attached to said window frame.

9. A glass run attachable to a window frame of a vehicle, comprising:

a channel-shaped body portion having an outside wall portion, a bottom wall portion and an inside wall portion;

a lock portion formed in an end portion of said outside wall portion;

a detachment preventing protrusion portion on an outside wall surface of said outside wall portion; and at least two pressure-contact portions respectively provided on base end portions of said outside wall portion and said inside wall portion corresponding to both ends of said bottom wall portion so as to be brought into pressure-contact with a car-exterior-side wall inner surface and a car-interior-side wall inner surface of said groove portion of said window frame, wherein said inside wall portion is larger than said outside wall portion, wherein said lock portion is brought into contact with a car-exterior-side outer edge of said window frame, while said body portion of said glass run is rotated around said lock portion so as to be fitted into said groove portion, wherein said pressure-contact portions include an outside holding lip and an inside holding lip which are elastically deformed when said body portion of said glass run is rotated to be fitted into said groove portion, wherein compression-direction force is given to at least said outside holding lip, when said outside and inside holding lips are elastically deformed, and said body portion is urged toward a bottom side of said groove portion by compression-direction restoring force of said outside holding lip after said body portion is fitted into said groove portion.

10. A glass run according to claim 9, further comprising shock absorbing means is provided in at least one of said car-interior-side wall inner surface of said groove portion and said inside wall portion of said glass run.

11. A glass run attachable to a window frame of a vehicle, comprising:
- a channel-shaped body portion having an outside wall portion, a bottom wall portion and an inside wall portion;
- a lock portion formed in an end portion of said outside wall portion;
- a detachment preventing protrusion portion on an outside wall surface of said outside wall portion;
- at least two pressure-contact portions respectively provided on base end portions of said outside wall portion and said inside wall portion corresponding to both ends of said bottom wall portion so as to be brought into pressure-contact with a car-exterior-side wall inner surface and a car-interior-side wall inner surface of said groove portion of said window frame; and
- shock absorbing means provided in at least one of said car-interior-side wall inner surface of said groove portion and said inside wall portion of said glass run, wherein said inside wall portion is larger than said outside wall portion, wherein said lock portion is brought into contact with a car-exterior-side outer edge of said window frame, while said body portion of said glass run is rotated around said lock portion so as to be fitted into said groove portion, wherein glass seal portions are provided in said inside wall portion and said outside wall portion, one glass seal portion on said inside wall portion being formed to extend from a middle of said inside wall portion, an extended inside wall portion being defined between a base end portion of said glass seal portion and a forward end of said inside wall portion, said shock absorbing means being provided in at least one of said extended inside wall portion and said car-interior-side wall inner surface of said groove portion of said window frame.

12. A glass run according to claim 11, wherein said shock absorbing means is provided at least one of (i) at a front end of an upper side portion of a window frame of a front door, or a vicinity of said front end of said upper side portion, and (ii) in said extended inside wall portion of said glass run corresponding to said front end of said upper portion of said window frame or said vicinity of said front end of said upper portion of said window frame.

13. A glass run according to claim 11, wherein said shock absorbing means if provided at least one of (i) at a rear end of an upper portion of a window frame of a rear door, or in a vicinity of said rear end of said upper portion, and (ii) in said extended inside wall portion of said glass run corresponding to said rear end of said upper portion of said window frame or said vicinity of said rear end of said upper portion of said window frame.

14. A glass run according to claim 11, wherein said shock absorbing means comprises a hollow portion formed in said inside wall portion of said glass run.

15. A glass run according to claim 11, wherein said shock absorbing means comprises a first lip portion formed in said inside wall portion of said glass run.

16. A glass run according to claim 15, wherein said first lip portion is provided so that a forward end portion of said first lip portion is released in a free state before said glass run is attached to said window frame, and said forward end portion abuts against a side surface of said inside wall portion so as to form a hollow portion in at least one of occasions when said window glass moves toward the car interior side and when said glass run is variously attached to said window frame.

17. A glass run according to claim 11, wherein said shock absorbing means comprises a sponge layer molded on a surface of said inside wall portion of said glass run so as to be integrated with said wall portion.

18. A glass run according to claim 11, wherein said shock absorbing means is a sponge member bonded onto at least one surface of said inside wall portion of said glass run and the car-interior-side wall inner surface of said groove portion of said window frame.

* * * * *